(12) United States Patent
Lee et al.

(10) Patent No.: US 12,413,669 B2
(45) Date of Patent: Sep. 9, 2025

(54) ELECTRONIC DEVICE FOR PERFORMING COMMUNICATION WITH COUNTERPART BY USING ASSISTANCE MODULE, AND CONTROL METHOD THEREOF

(71) Applicant: Samsung Electronics Co., Ltd., Suwon-si (KR)

(72) Inventors: Eunkyung Lee, Suwon-si (KR); Eunsun Kim, Suwon-si (KR); Jiyeon Yoo, Suwon-si (KR); Yooli Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 18/467,143

(22) Filed: Sep. 14, 2023

(65) Prior Publication Data

US 2024/0007561 A1 Jan. 4, 2024

Related U.S. Application Data

(63) Continuation of application No. PCT/KR2022/002594, filed on Feb. 22, 2022.

(30) Foreign Application Priority Data

Mar. 15, 2021 (KR) .......................... 10-2021-0033608

(51) Int. Cl.
*H04M 3/00* (2024.01)
*H04L 12/66* (2006.01)
(Continued)

(52) U.S. Cl.
CPC .... *H04M 3/42238* (2013.01); *H04M 2201/42* (2013.01); *H04M 2250/74* (2013.01)

(58) Field of Classification Search
CPC ........... H04M 1/2535; H04M 3/42059; H04M 3/527; H04M 2201/40; H04M 2250/74;
(Continued)

(56) References Cited

U.S. PATENT DOCUMENTS 10,715,648 B1 * 7/2020 Vashisht ................. H04M 3/20
11,355,098 B1 * 6/2022 Zhong ..................... G10L 15/22
(Continued)

FOREIGN PATENT DOCUMENTS

CN 112153223 A 12/2020
JP 2008-048290 A 2/2008
(Continued)

OTHER PUBLICATIONS

International Search Report with Written Opinion and English translation dated Jun. 3, 2022; International Appln. No. PCT/KR2022/002594.

*Primary Examiner* — Kharye Pope
(74) *Attorney, Agent, or Firm* — Jefferson IP Law, LLP

(57) ABSTRACT

An electronic device for performing communication with a counterpart by using an assistance module, and a control method thereof are provided. The electronic device includes a touchscreen display and at least one processor, wherein the at least one processor is configured to display a notification window indicating whether to perform a call with the assistance module of the electronic device, based on an occurrence of an incoming call, perform the call, with a counterpart that originated the incoming call, through the assistance module, based on a selection input to the notification window, and in response to receiving a control utterance for controlling the electronic device from the counterpart that is received during the call, control the electronic device according to the control utterance.

20 Claims, 34 Drawing Sheets

(51) Int. Cl.
*H04M 3/42* (2006.01)
*H04M 5/00* (2006.01)

(58) Field of Classification Search
CPC .. H04M 3/42382; H04M 3/436; H04M 1/271; H04M 3/4365; H04M 1/6033; H04M 1/006; G06F 3/167; G06F 3/017; G06F 3/04817; G06F 3/0482; G06F 40/35; G06F 16/3329; G06F 40/20; G06F 3/04883; G06F 3/016; G06F 3/041
See application file for complete search history.

(56) References Cited

U.S. PATENT DOCUMENTS

| | | | |
|---|---|---|---|
| 2007/0172042 A1* | 7/2007 | Winikoff | H04M 3/436 379/142.05 |
| 2010/0029230 A1 | 2/2010 | Linsky | |
| 2013/0040615 A1 | 2/2013 | Sawhney et al. | |
| 2014/0029734 A1* | 1/2014 | Kim | H04M 1/64 379/88.01 |
| 2014/0179281 A1 | 6/2014 | Kim et al. | |
| 2015/0092933 A1* | 4/2015 | Goulet | H04M 3/436 379/142.05 |
| 2018/0227417 A1 | 8/2018 | Segalis et al. | |
| 2019/0207946 A1 | 7/2019 | Mertens et al. | |
| 2019/0208057 A1 | 7/2019 | Cho et al. | |
| 2019/0295542 A1* | 9/2019 | Huang | G06F 3/167 |
| 2020/0097142 A1 | 3/2020 | Kim | |
| 2020/0125321 A1* | 4/2020 | Fox | G10L 15/25 |
| 2020/0204677 A1 | 6/2020 | Kim | |
| 2020/0259951 A1* | 8/2020 | Arshad | H04M 3/4211 |
| 2020/0395012 A1 | 12/2020 | Kim et al. | |
| 2021/0026593 A1* | 1/2021 | Wang | G10L 15/22 |
| 2021/0134286 A1* | 5/2021 | Burton | G06F 9/453 |
| 2021/0385638 A1* | 12/2021 | Stawiszynski | H04W 76/50 |
| 2022/0043938 A1* | 2/2022 | Kochura | G06F 21/6245 |
| 2022/0166871 A1* | 5/2022 | Shoushan | H04L 65/1069 |
| 2022/0254337 A1* | 8/2022 | O'Brien | G06Q 10/10 |

FOREIGN PATENT DOCUMENTS

| | | |
|---|---|---|
| KR | 10-2006-0033227 A | 4/2006 |
| KR | 10-2013-0094455 A | 8/2013 |
| KR | 10-2014-0082423 A | 7/2014 |
| KR | 10-1919858 B1 | 11/2018 |
| KR | 10-2019-0051368 A | 5/2019 |
| KR | 10-2019-0099275 A | 8/2019 |
| KR | 10-2020-0076439 A | 6/2020 |
| KR | 10-2151626 B1 | 9/2020 |
| KR | 10-2021-0004854 A | 1/2021 |
| KR | 10-2217301 B1 | 2/2021 |
| WO | 2010/014992 A1 | 2/2010 |
| WO | 2018/174513 A1 | 9/2018 |

* cited by examiner

ELECTRONIC DEVICE FOR PERFORMING COMMUNICATION WITH COUNTERPART BY USING ASSISTANCE MODULE, AND CONTROL METHOD THEREOF

CROSS-REFERENCE TO RELATED APPLICATION(S)

This application is a continuation application, claiming priority under § 365(c), of an International application No. PCT/KR2022/002594, filed on Feb. 22, 2022, which is based on and claims the benefit of a Korean patent application number 10-2021-0033608, filed on Mar. 15, 2021, in the Korean Intellectual Property Office, the disclosure of which is incorporated by reference herein in its entirety.

BACKGROUND

1. Field

The disclosure relates to an electronic device that communicates with a counterpart using an assistance module and a method for controlling the same.

2. Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

The above information is presented as background information only to assist with an understanding of the disclosure. No determination has been made, and no assertion is made, as to whether any of the above might be applicable as prior art with regard to the disclosure.

SUMMARY

A user of an electronic device (e.g., a smartphone) may receive a call from a counterpart. However, the user of the electronic device may be unable to answer a call originated by the counterpart. In this case, the user of the electronic device receiving the call from the counterpart may transmit a message indicating that the call cannot be answered to the counterpart. However, the function or operation of transmitting such a message to the counterpart may not meet the intent of the counterpart that originated the call. For example, if the counterpart originating the call urgently needs specific data, the function or operation of sending a message to the user who originates the call may not achieve the purpose that the counterpart originating the call intended. Further, according to the prior art, when the user of the electronic device wants to change the settings of her electronic device but does not know how to change the settings during a call with the counterpart who originates the call, the user listens to the counterpart's explanation as to how to manipulate the electronic device and then manipulates the electronic device according to the explanation.

Aspects of the disclosure are to address at least the above-mentioned problems and/or disadvantages and to provide at least the advantages described below. Accordingly, an aspect of the disclosure is to provide an electronic device capable of perform communication with the counterpart originating a call through an assistance module (e.g., Samsung® Bixby) embedded in the user's electronic device when the user of the electronic device is in a situation where she cannot receive a call.

Another aspect of the disclosure is to provide an electronic device capable of changing the settings of the electronic device through an assistance module (e.g., Samsung® Bixby) embedded in the user's electronic device according to the counterpart's utterance when it is required to change the settings of the user's electronic device receiving a call during a call with the counterpart.

Another aspect of the disclosure is to provide a method for controlling an electronic device capable of perform communication with the counterpart originating a call through an assistance module (e.g., Samsung® Bixby) embedded in the user's electronic device when the user of the electronic device is in a situation where she cannot receive a call.

Another aspect of the disclosure is to provide a method for controlling an electronic device capable of changing the settings of the electronic device through an assistance module (e.g., Samsung® Bixby) embedded in the user's electronic device according to the counterpart's utterance when it is required to change the settings of the user's electronic device receiving a call during a call with the counterpart.

In accordance with an aspect of the disclosure, an electronic device is provided. The electronic device includes a touchscreen display and at least one processor configured to display a notification window indicating whether to perform a call with an assistance module of the electronic device, based on an occurrence of an incoming call, perform the call, with a counterpart that originated the incoming call, through the assistance module, based on a selection input to the notification window, and in response to a control utterance for controlling the electronic device from the counterpart that is received during the call, control the electronic device according to the control utterance.

In accordance with another aspect of the disclosure, an electronic device is provided. The electronic device includes at least one speaker, a touchscreen display, and at least one processor configured to perform a call with a counterpart that originated an incoming call based on an occurrence of the incoming call, wherein a call screen indicating that the call is in progress is displayed during the call, and a graphic object for a three-way call with an assistance module of the electronic device is included in the call screen, perform the three-way call in response to a selection input to the graphic object that is received during the call, wherein an utterance by the assistance module during the three-way call is output through the at least one speaker, and in response to a control utterance for controlling the electronic device from the counterpart that is received during the three-way call, control the electronic device according to the control utterance.

In accordance with another aspect of the disclosure, an electronic device is provided. The electronic device includes a touchscreen display and at least one processor configured to display an execution screen of a message application, the execution screen of the message application including a plurality of message lists, receive a first touch input to select any one message list from among the plurality of message lists, display content of a message corresponding to the selected message list, along with a graphical element for inputting a speech command, in response to reception of the first touch input, receive a second touch input to select the graphical element, receive an utterance command related to the content of the message from a user after receiving the second touch input, and process the message according to the utterance command in response to reception of the utterance command.

According to an embodiment of the disclosure, it is possible to perform communication with the counterpart originating a call through an assistance module (e.g., Samsung® Bixby) embedded in the user's electronic device when the user of the electronic device is in a situation where she cannot receive a call.

According to an embodiment of the disclosure, it is possible to change the settings of the electronic device through an assistance module (e.g., Samsung® Bixby) embedded in the user's electronic device according to the counterpart's utterance when it is required to change the settings of the user's electronic device receiving a call during a call with the counterpart.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
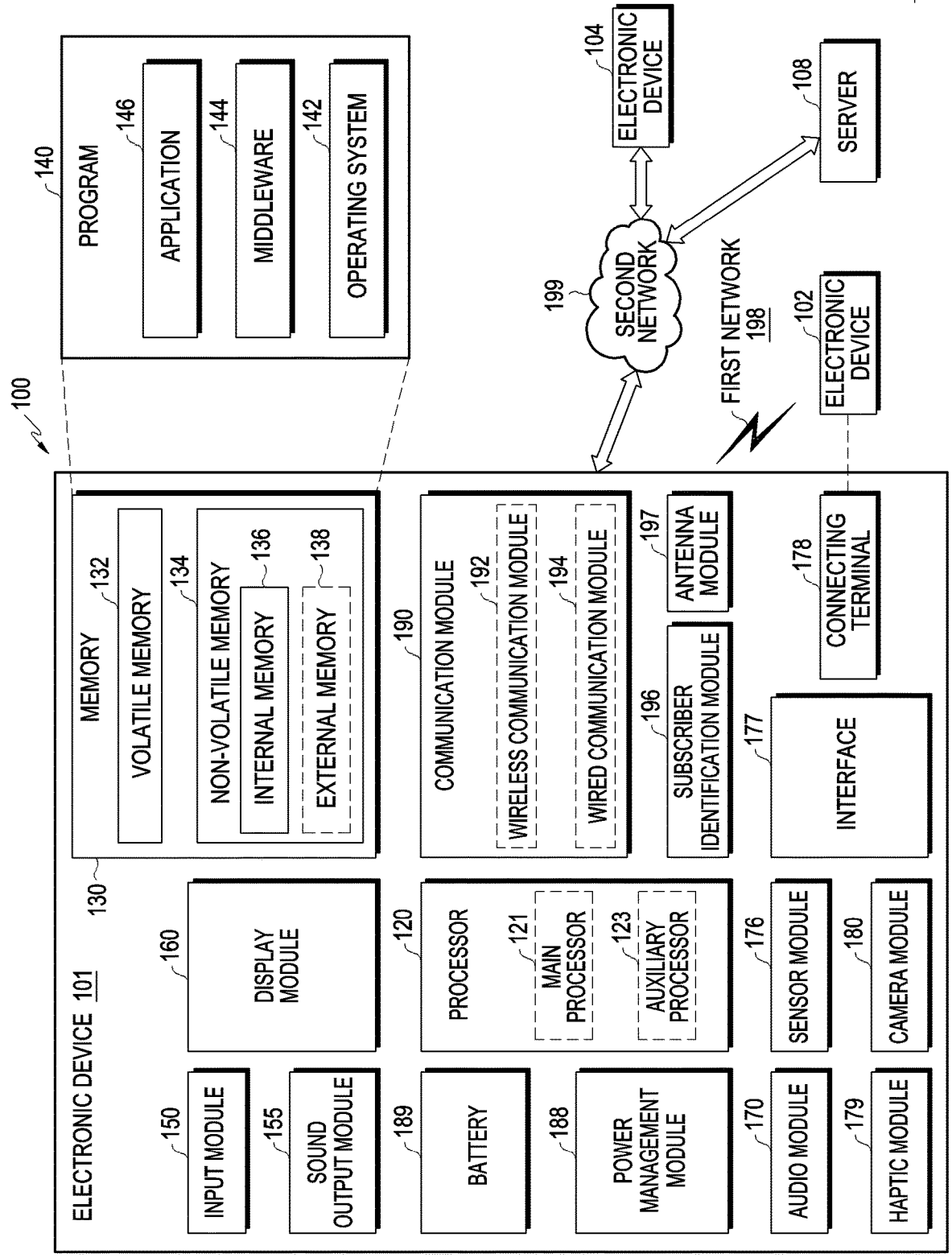
FIG. 1 is a view illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
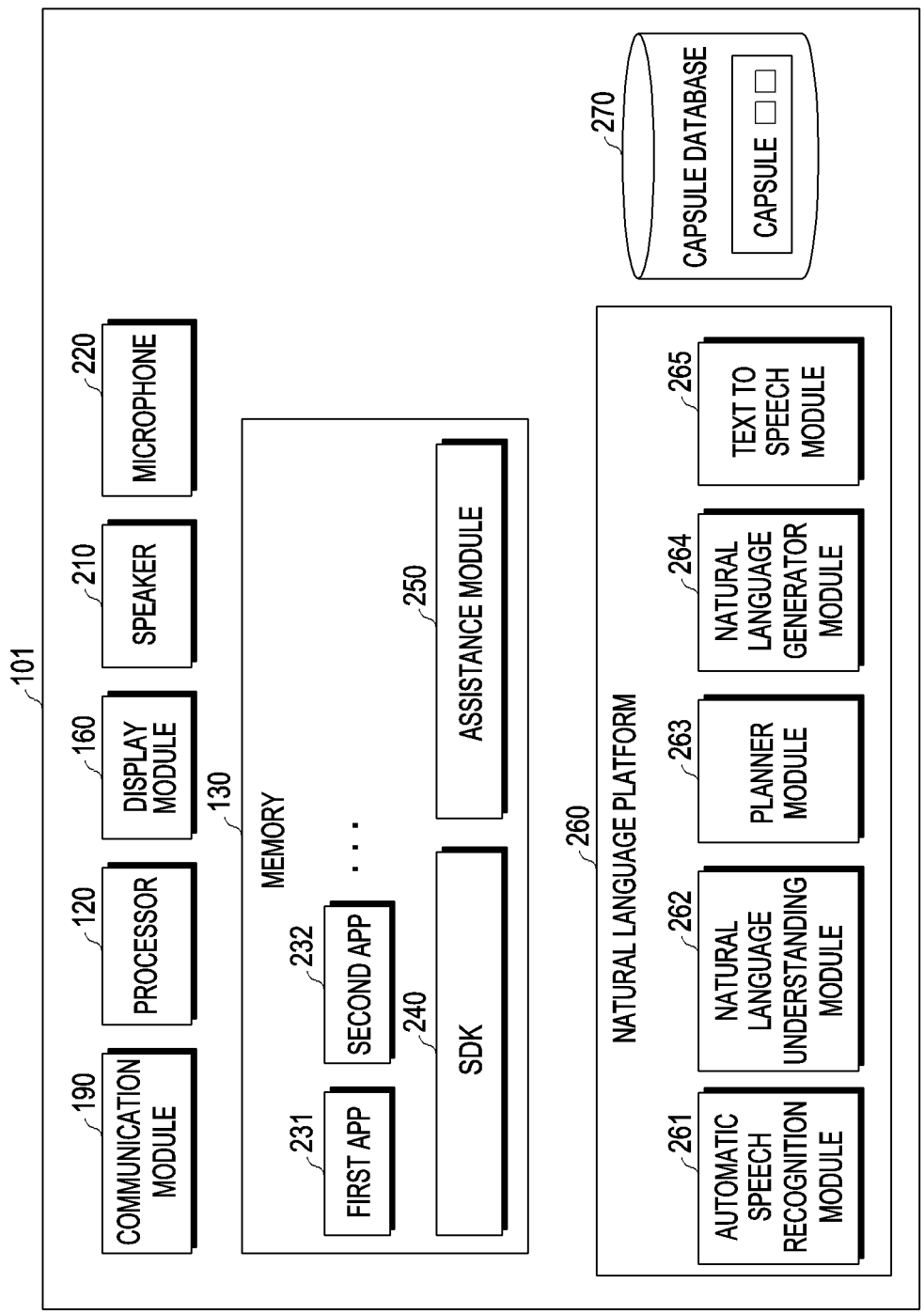
FIG. 2 is an example view illustrating an electronic device according to an embodiment of the disclosure.

FIG. 2 is an example view illustrating an electronic device 101 according to an embodiment of the disclosure.

Referring to FIG. 2, an electronic device 101 according to an embodiment of the disclosure may include at least one of a processor 120, a memory 130, a display module 160, a communication module 190, a speaker 210, a microphone 220, a natural language platform 260, and a capsule database 270.

The memory 130 according to an embodiment of the disclosure may store a plurality of apps 231 and 232, a software development kit (SDK) 240, and an assistance module 250. The assistance module 250 and the SDK 240 according to an embodiment of the disclosure may configure a framework (or solution program) for performing general-purpose functions. Further, the assistance module 250 or SDK 240 according to an embodiment of the disclosure may configure a framework for processing speech input. In the disclosure, the assistance module 250 according to an embodiment of the disclosure may be used as a term meaning an "intelligent app (e.g., Samsung® Bixby)" program itself. The plurality of apps 231 and 232 stored in the memory 130 according to an embodiment of the disclosure may be programs for performing designated functions. According to an embodiment of the disclosure, each of the plurality of apps 231 and 232 may include a plurality of operations for performing a designated function. For example, the plurality of apps 231 and 232 according to an embodiment of the disclosure may include a call app, an alarm app, a message app, and/or a schedule app. According to an embodiment of the disclosure, the plurality of apps 231 and 232 may be executed by the processor 120 to sequentially execute at least some of the plurality of operations.

The processor 120 according to an embodiment of the disclosure may execute a program stored in the memory 130 to perform a designated function. For example, the processor 120 according to an embodiment of the disclosure may execute at least one of the assistance module 250 or the SDK 240 to perform various operations for processing a speech input. The processor 120 according to an embodiment of the disclosure may control operations of the plurality of apps 231 and 232 through, e.g., the SDK 240. The following operations described as operations of the assistance module 250 or SDK 240 according to an embodiment of the disclosure may be operations performed by the processor 120. The assistance module 250 according to an embodiment of the disclosure may be implemented to be included, as an element constituting the processor 120, in the processor 120. Alternatively, at least one operation performed by the assistance module 250 according to an embodiment of the disclosure may be performed by the processor 120.

The assistance module 250 according to an embodiment of the disclosure may receive a speech input. For example, the assistance module 250 according to an embodiment of the disclosure may receive a speech signal corresponding to a user utterance detected through the microphone 220 or the counterpart's speech signal transmitted from the outside through the communication module 190. The assistance module 250 according to an embodiment of the disclosure may transmit the received speech input to the natural language platform 260. The assistance module 250 according to an embodiment of the disclosure may receive a result corresponding to the received speech input. For example, when the natural language platform 260 and/or the processor 120 may produce a result corresponding to the received speech input, the assistance module 250 may receive the result corresponding to the received speech input from the natural language platform 260 and/or processor 120. The assistance module 250 according to an embodiment of the disclosure may display the received result on the display module 160. The assistance module 250 according to an embodiment of the disclosure may receive a plan corresponding to the received speech input from the natural language platform 260. The assistance module 250 according to an embodiment of the disclosure may display a result of executing a plurality of operations of an app on the display module 160 according to the received plan. The assistance module 250 according to an embodiment of the disclosure may sequentially display execution results of a plurality of operations on the display module 160. The plan according to an embodiment of the disclosure may be generated by an artificial intelligent (AI) system. The artificial intelligent system according to an embodiment of the disclosure may be a rule-based system or a neural network-based system (e.g., feedforward neural network (FNN)) or recurrent neutral network (RNN)). Or, the artificial intelligent system may be a combination thereof or a system different therefrom. According to an embodiment of the disclosure, the plan may be selected from a set of pre-defined plans or created in real-time in response to a user request. For example, the artificial intelligent system may select at least one plan from among a plurality of pre-defined plans. As another example, the electronic device 101 according to an embodiment of the disclosure may display, on the display module 160, only some results of executing a plurality of operations (e.g., a result of the last operation). The assistance module 250 according to an embodiment of the disclosure may include a speech recognition module. According to an embodiment of the disclosure, the assistance module 250 may recognize a speech input performing a limited function through the speech recognition module. For example, the assistance module 250 may execute an intelligent app to process the speech input through a designated input (e.g., wake up!).

The natural language platform 260 according to an embodiment of the disclosure may include at least one module among an automatic speech recognition module (ASR module) 261, a natural language understanding module (NLU module) 262, a planner module 263, a natural language generator module (NLG module) 264, or a text to speech module (TTS module) 265. The natural language platform 260 according to an embodiment of the disclosure may be implemented to be included, as part of the elements constituting the processor 120, in the processor 120.

The automatic speech recognition module 221 according to an embodiment of the disclosure may convert the speech input received by the electronic device 101 or the speech input transmitted from an external electronic device through the communication module 190 into text data. The natural language understanding module 262 according to an embodiment of the disclosure may determine the user's intent based on the converted text data. For example, the natural language understanding module 262 may perform syntactic analysis or semantic analysis to grasp the user's intent. The natural language understanding module 262 according to an embodiment of the disclosure may grasp the meaning of a word extracted from the speech input using linguistic features (e.g., syntactic elements) of morphemes or phrases, match the grasped meaning of the word to the intent, and determine the user's intent.

The planner module 263 according to an embodiment of the disclosure may generate a plan using the parameter and intent determined by the natural language understanding module 262. The planner module 263 according to an embodiment of the disclosure may determine a plurality of domains necessary to perform a task based on the determined intent. The planner module 263 according to an embodiment of the disclosure may determine the plurality of operations included in the plurality of domains determined based on the determined intent. According to an embodiment of the disclosure, the planner module 263 may determine parameters required to execute the determined plurality of operations or result values output by execution of the plurality of operations. The parameters and resultant values according to an embodiment of the disclosure may be defined in a designated format (or class) of concept. Thus, the plan may include the plurality of actions determined by the user's intent and a plurality of concepts. The planner module 263 according to an embodiment of the disclosure may stepwise (or hierarchically) determine the relationship between the plurality of actions and the plurality of concepts. For example, the planner module 263 according to an embodiment of the disclosure may determine an execution order of the plurality of determined actions. In other words, the planner module 225 according to an embodiment of the disclosure may determine the order of execution of the plurality of actions based on the result output by execution of the plurality of actions and the parameters necessary to execute the plurality of actions. Thus, the planner module 263 according to an embodiment of the disclosure may generate a plan that contains association information (e.g., ontology) between the plurality of actions and the plurality of concepts. The planner module 263 according to an embodiment of the disclosure may generate a plan using information stored in the capsule database 270 in which a set of relationships between concepts and actions is stored.

The natural language generator module 264 according to an embodiment of the disclosure may convert designated information into a text type. According to an embodiment of the disclosure, the text-type information may be in the form of a natural language utterance. The text to speech module 265 according to an embodiment of the disclosure may convert text information into speech information.

The capsule database 270 according to an embodiment of the disclosure may store information about the relationship between the plurality of concepts and actions corresponding to the plurality of domains. The capsule according to an embodiment of the disclosure may include a plurality of concept objects (or concept information) and a plurality of action objects (or action information) included in the plan. According to an embodiment of the disclosure, the capsule database 270 may store a plurality of capsules in the form of a concept action network (CAN). According to an embodiment of the disclosure, the plurality of capsules may be stored in a function registry included in the capsule database 270. The capsule database 270 according to an embodiment of the disclosure may include a strategy registry storing strategy information necessary to determine the plan corresponding to the speech input. The strategy information according to an embodiment of the disclosure may include reference information for determining one plan if there are a plurality of plans corresponding to the speech input. According to an embodiment of the disclosure, the capsule database 270 may include a follow up registry storing follow up information to propose a follow-up action to the user in a designated context. The follow-up action according to an embodiment of the disclosure may include, e.g., a follow-up utterance. According to an embodiment of the disclosure, the capsule database 270 may include a layout registry storing layout information about the information output via the electronic device 101. According to an embodiment, the capsule database 270 may include a vocabulary registry storing vocabulary information included in capsule information. According to an embodiment of the disclosure, the capsule database 270 may include a dialog registry storing dialog (or interaction) information with the user. According to an embodiment of the disclosure, the capsule database 270 may be implemented in the memory 130 as well.

Figure 3:
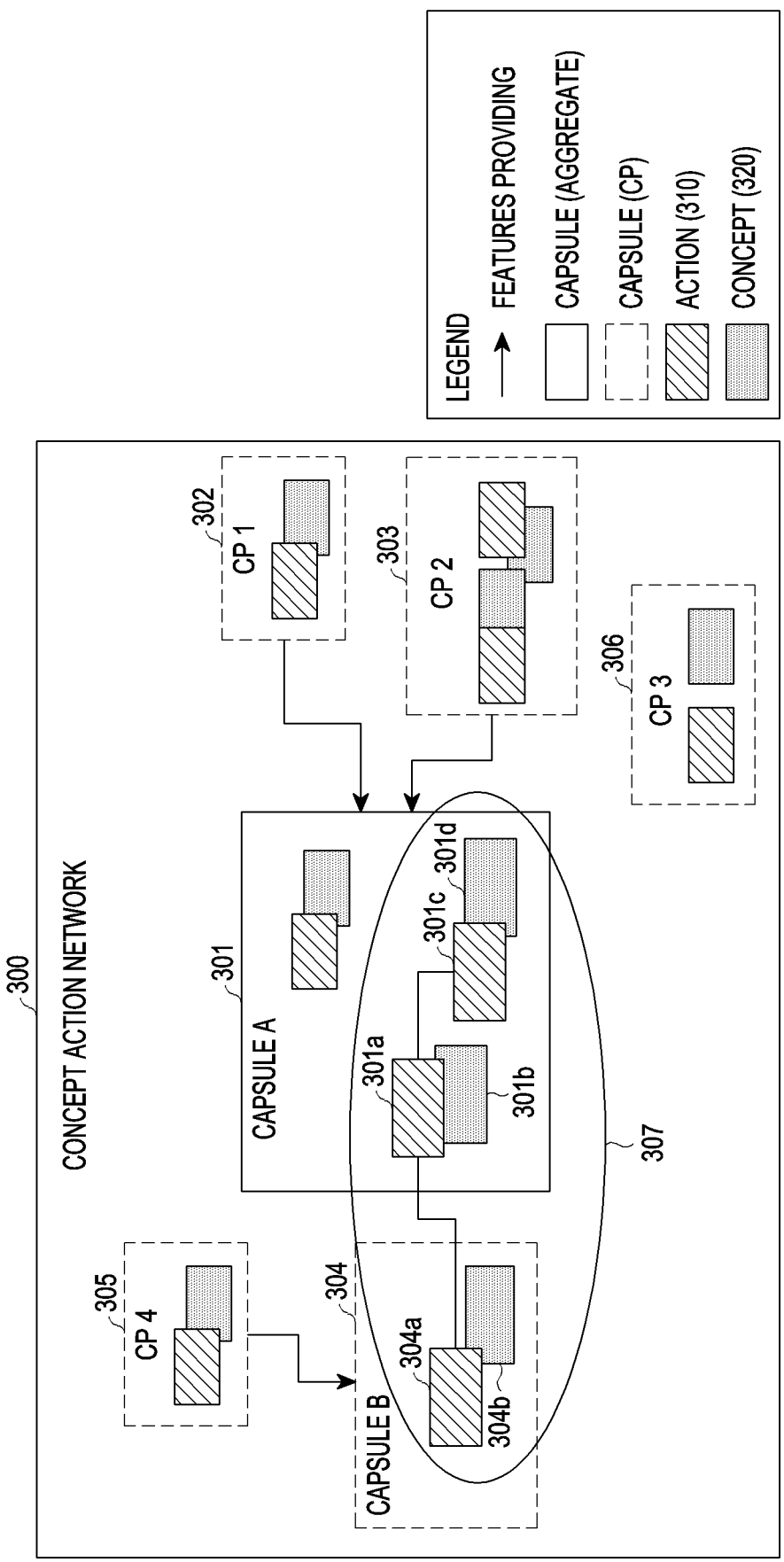
FIG. 3 is a view illustrating an example in which information for the relationship between concept and action is stored in a database according to an embodiment of the disclosure.

FIG. 3 is a view illustrating an example in which information for the relationship between concept and action is stored in a database according to an embodiment of the disclosure.

The capsule database 270 according to an embodiment of the disclosure may store the capsule in the form of a concept action network (CAN) 300. The capsule database 270 according to an embodiment of the disclosure may store an operation for processing a task corresponding to the user's speech input and a parameter necessary for the operation in the form of the CAN 300. The capsule database 270 according to an embodiment of the disclosure may store a plurality of capsules (capsule(A) 301 and capsule(B) 304) respectively corresponding to a plurality of domains (e.g., applications). According to an embodiment, one capsule (e.g., capsule(A) 301) may correspond to one domain (e.g., location (geo), application). Further, one capsule may correspond to at least one service provider (e.g., CP 1 302, CP 2 303, CP 3 306, or CP 4 305) for performing a function for a domain related to the capsule. According to an embodiment, one capsule may include at least one or more actions 310 and at least one or more concepts 320 for performing a designated function. The natural language platform 260 according to an embodiment of the disclosure may generate a plan for performing a task corresponding to the received speech input using a capsule stored in the capsule database 270. For example, the planner module 263 of the natural language platform 260 may generate a plan using a capsule stored in the capsule database 270. For example, a plan 307 may be generated using actions 301a and 301c and concepts 301b and 301d of capsule A 310 and an action 304a and concept 304b of capsule B 304.

Figure 4:
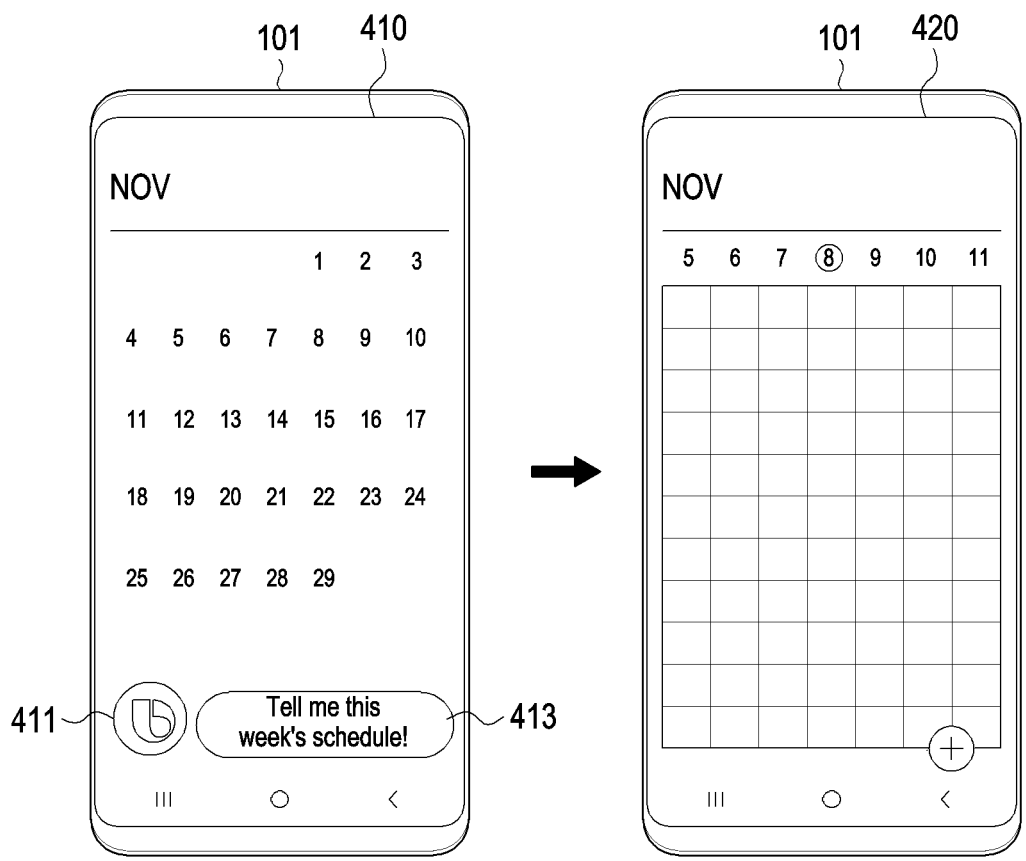
FIG. 4 is an example view illustrating an electronic device displaying a screen processing a speech input received through an assistance module (e.g., intelligent app) according to an embodiment of the disclosure.

FIG. 4 is an example view illustrating an electronic device displaying a screen processing a speech input received through an assistance module 250 (e.g., intelligent app) according to an embodiment of the disclosure.

According to an embodiment of the disclosure, upon recognizing a designated speech input (e.g., wake up!) or receiving an input through a hardware key (e.g., a dedicated hardware key) on a screen 410, the electronic device 101 (e.g., the processor 120) may execute the intelligent app (e.g., the assistance module 250) to process the speech input. The electronic device 101 according to an embodiment of the disclosure may, e.g., execute an intelligent app in a state in which a schedule app is executed. According to an embodiment of the disclosure, the electronic device 101 may display an object (e.g., icon) 411 corresponding to an intelligent app on the display module 160. According to an embodiment of the disclosure, the electronic device 101 may receive a speech input through the user utterance. For example, the electronic device 101 may receive a speech input saying, "Tell me this week's schedule!". According to an embodiment of the disclosure, the electronic device 101 displays a user interface (UI) 413 (e.g., input window) of the intelligent app displaying the text data of the received speech input on the display module 160. According to an embodiment of the disclosure, on a screen 420, the electronic device 101 may display a result corresponding to the received speech input on the display module 160. For example, the electronic device 101 may display "this week's schedule" on the display module 160 based on the plan corresponding to the received user input.

Figure 5:
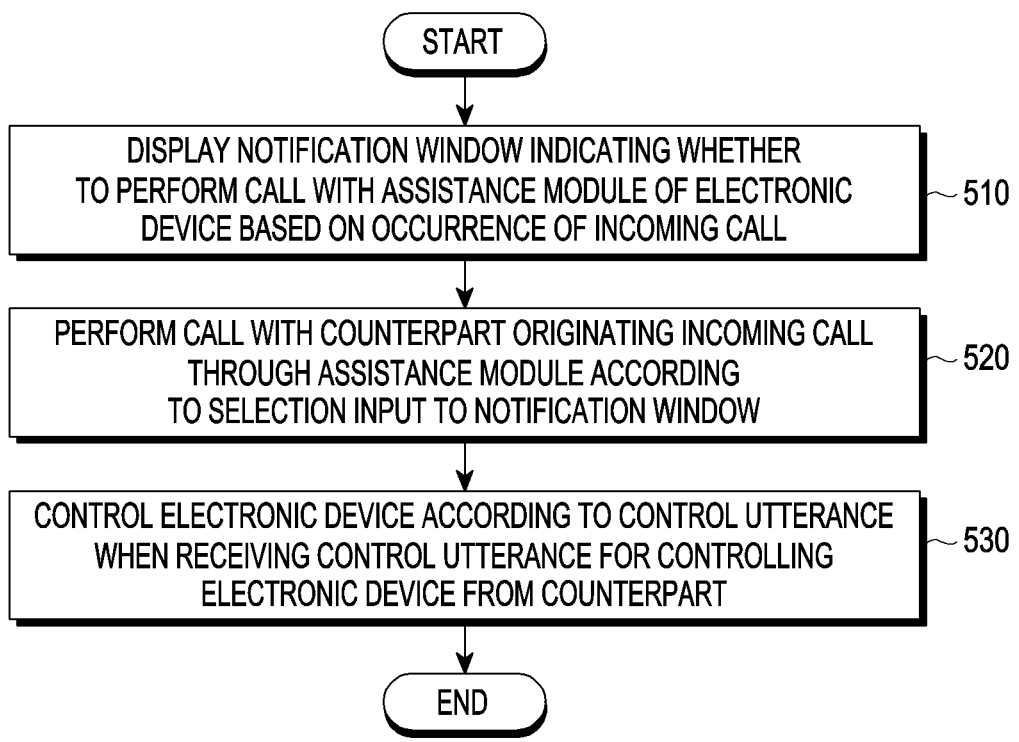
FIG. 5 is an example view illustrating a function or operation for initiating a call with a counterpart through an assistance module by an electronic device and controlling the electronic device according to a counterpart's control utterance according to an embodiment of the disclosure.

FIG. 5 is an example view illustrating a function or operation for initiating a call with a counterpart through an assistance module 250 (e.g., Samsung® Bixby) by an electronic device and controlling the electronic device according to a counterpart's control utterance according to an embodiment of the disclosure.

FIGS. 6A, 6B, 6C, 6D, 6E, 6F, 6G, and 6H are example views illustrating the function or operation described with reference to FIG. 5 in light of a user interface according to various embodiments of the disclosure.

Figure 6A:
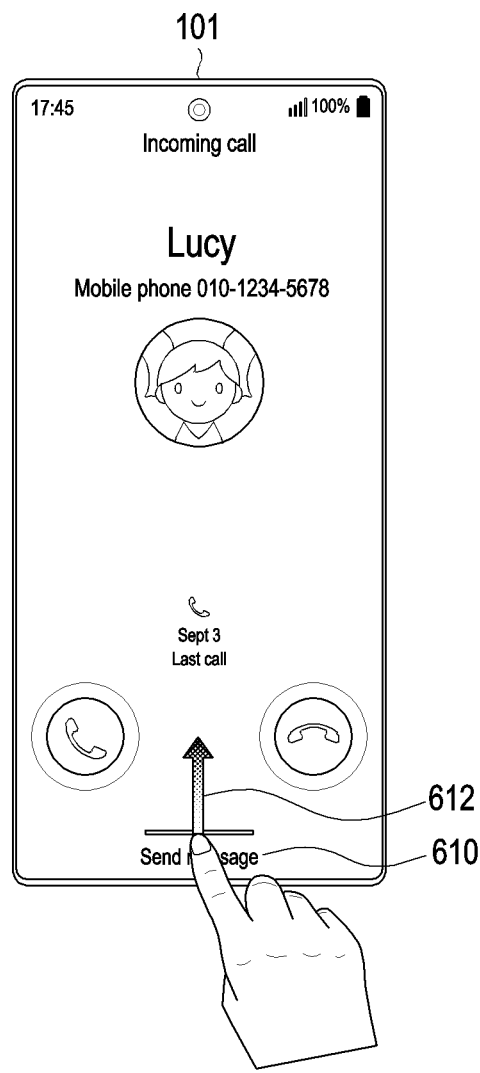
FIGS. 6A, 6B, 6C, 6D, 6E, 6F, 6G, and 6H are example views illustrating the function or operation described with reference to FIG. 5 in light of a user interface according to an embodiment of the disclosure.
Figure 6B:
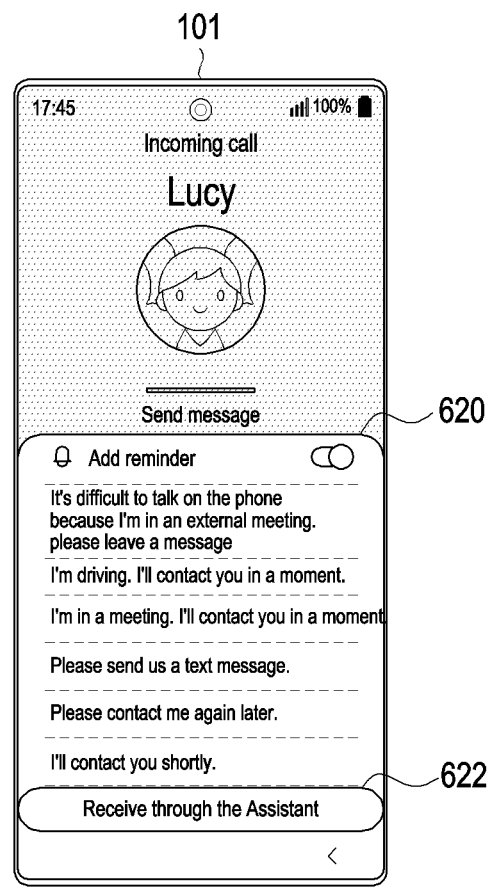

Referring to FIG. 5, in operation 510, the electronic device 101 (e.g., the processor 120) according to an embodiment of the disclosure may display a notification window indicating whether to perform a call with the assistance module 250 of the electronic device 101, based on the occurrence of the incoming call. Referring to FIG. 6A, the electronic device 101 according to an embodiment of the disclosure may display a screen indicating occurrence of an incoming call. The electronic device 101 according to an embodiment of the disclosure may receive a user input 612 to the graphical element 610 for displaying a message for performing a call with the assistance module 250. The user input 612 according to an embodiment of the disclosure may include a swipe input toward an upper end of the electronic device 101, but the type of the user input 612 is not limited thereto. Referring to FIG. 6B, the electronic device 101 according to an embodiment of the disclosure may display a notification window 620 including an item 622 (e.g., "Receive through the Assistant") indicating whether to perform a call with the assistance module 260 of the electronic device 101. According to another embodiment of the disclosure, a graphic object (e.g., an icon) for performing a call with the assistance module may be displayed on the screen indicating the occurrence of the incoming call illustrated in FIG. 6A. Upon receiving a selection input to a graphic object (e.g., an icon) for performing a call with the assistance module, the electronic device 101 according to an embodiment of the disclosure may perform a call with the counterpart who has originated the incoming call through the assistance module 250. According to another embodiment of the disclosure, the electronic device 101 may control to perform a call with the counterpart that has originated the incoming call through the assistant module 250 according to the direction in which the call button 616 is moved. For example, the electronic device 101 according to an embodiment of the disclosure may control to perform a call with the assistance module when the call button 616 is dragged in the horizontal direction, and may control to perform a call with the user of the electronic device 101 when the call button 616 is dragged in the vertical direction. To this end, the electronic device 101 according to an embodiment of the disclosure may display a graphic object (e.g., an arrow and a name of a corresponding function or operation) around the call button 616 to guide that different functions or operations may be performed depending on the movement direction of the call button 616.

Figure 6C:
Figure 6D:
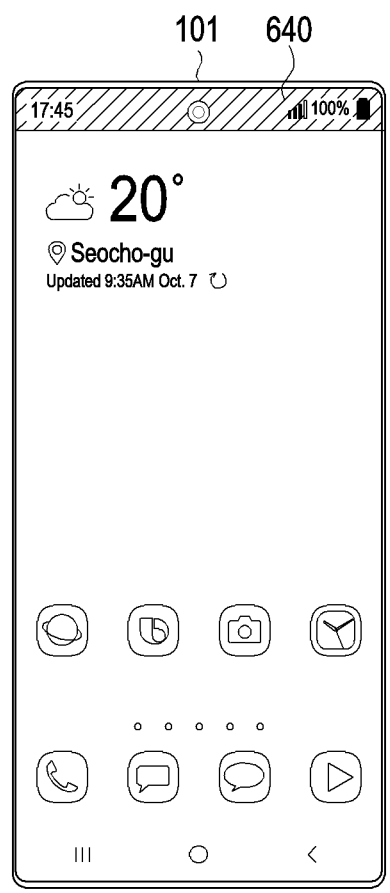

In operation 520, the electronic device 101 (e.g., the processor 120) according to an embodiment of the disclosure may perform a call with the counterpart that has originated the incoming call through the assistant module 250 according to a selection input to the notification window 620. Referring to FIG. 6C, when receiving a selection input to an item 622 or a selection input to a graphic object (e.g., an icon) for performing a call with an assistance module from the user of the electronic device 101, the electronic device 101 according to an embodiment of the disclosure may display a message 630 (e.g., "Assistant starts a call with Lucy") indicating to start a call with the assistant module 250 or an icon (e.g., a Samsung® Bixby icon) having a specific shape and/or color indicating to start a call with the assistant module 250. The electronic device 101 (e.g., the assistance module 250 or the processor 120) according to an embodiment of the disclosure may perform a call with the counterpart by analyzing the counterpart's utterance transmitted from the outside and transmitting the utterance content according to the analysis result to the counterpart's electronic device. Referring to FIG. 6D, in the electronic device 101 according to an embodiment of the disclosure, the area in which the status bar 634 is displayed while the counterpart performs a call with the assistant module 250 may be displayed in a color (e.g., pink) different from the color (e.g., green) displayed when a general call is performed (e.g., when the counterpart and the user of the electronic device 101 perform a call).

Figure 6E:
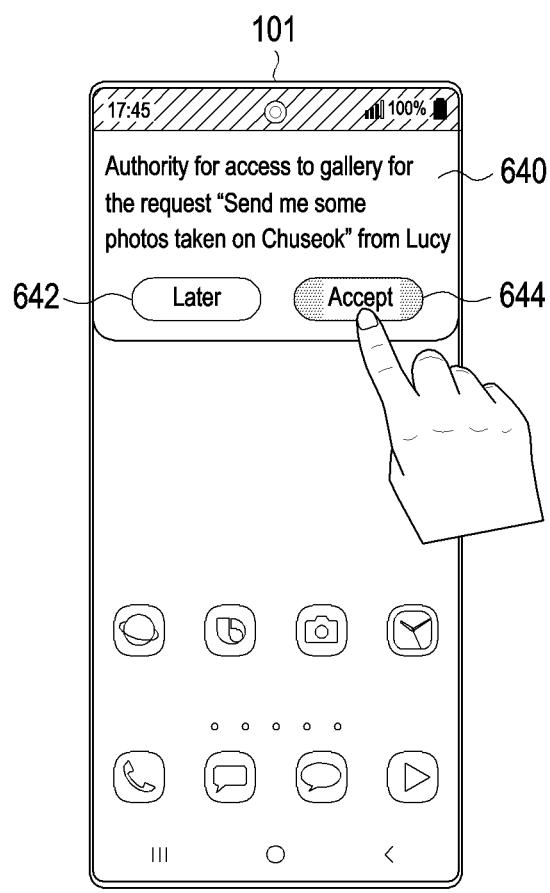
Figure 6F:
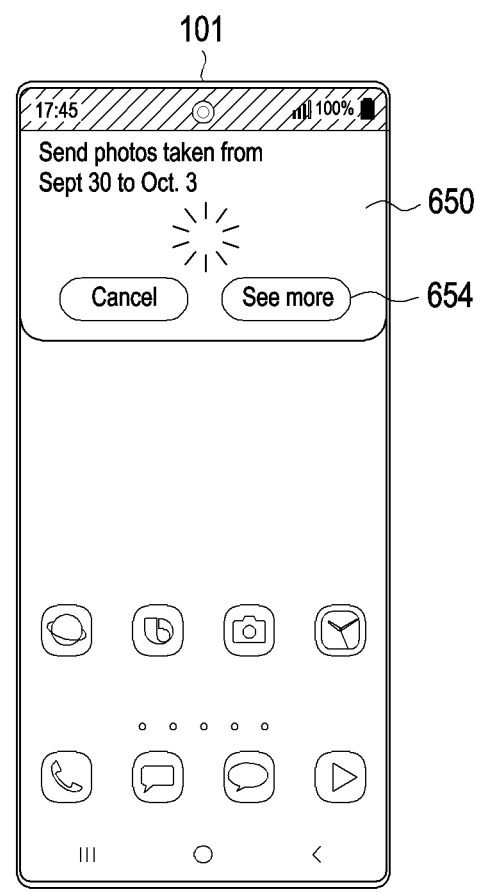
Figure 6G:
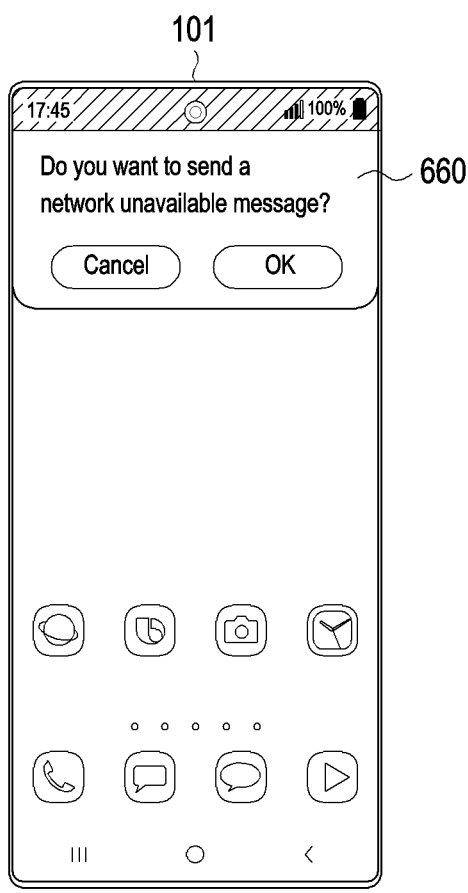
Figure 6H:
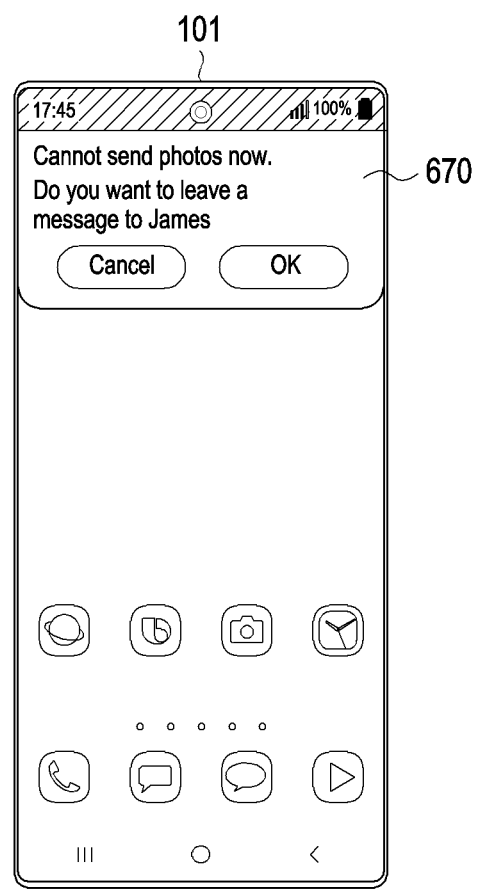

In operation 530, when a control utterance for controlling the electronic device 101 is received from the counterpart, the electronic device 101 according to an embodiment of the disclosure may control the electronic device 101 according to the control utterance. According to an embodiment of the disclosure, when receiving the utterance "Send me some photos taken on Chuseok" from the counterpart, the electronic device 101 may identify the intent of the counterpart's utterance and may display a first notification message 640 as illustrated in FIG. 6E. According to an embodiment of the disclosure, after analyzing the utterance intent of the counterpart, the electronic device 101 according to an embodiment of the disclosure may display a first notification message 640 as illustrated in FIG. 6E for the utterance determined to require user authentication. For example, the utterance determined to require user authentication may include at least one of a request for access to a gallery application (e.g., when the utterance for a request for transmission of a file such as a photo and/or a video is received), a request for access to a schedule application (e.g., when the utterance for identifying the user's schedule is received), a request for access to a setting application of the electronic device 101 (e.g., when the utterance for changing a specific setting value set for the electronic device 101 is received), a request for access to a password and/or a request for access to information stored in a security container (e.g., Samsung® Knox) or security area preset or set by the user. However, according to an embodiment of the disclosure, the function or operation according to the utterance of the counterpart may be performed without displaying the first notification message 640 (in other words, without performing user authentication) according to the attribute (e.g., whether the counterpart is a family member or a coworker) of the counterpart who has originated the call. The electronic device 101 according to an embodiment of the disclosure may identify, e.g., a group (e.g., family or company) to which the counterpart who has originated the call belongs, stored in the contact application, and may identify the attribute of the counterpart based on the identified group. The first notification message 640 according to an embodiment of the disclosure may include a first button 642 for later transmitting at least one image stored in the electronic device 101 and a second button 644 for immediately transmitting at least one image stored in the electronic device 101. Referring to FIG. 6E, when a selection input to the second button 644 is received from the user, the electronic device 101 according to an embodiment of the disclosure may transmit at least one image taken during a period (e.g., September 30 to October 3) corresponding to the Chuseok holiday to the electronic device of the counterpart. According to an embodiment of the disclosure, while transmitting the at least one image to the counterpart's electronic device, a second notification message 650 including the content that the at least one image is being transmitted may be displayed on the electronic device 101. The second notification message 650 according to an embodiment of the disclosure may include the third button 654 for displaying a screen (e.g., an execution screen of the message application) including the call content between the counterpart and the assistance module 250. However, when the current network state is unstable (e.g., when the transmission speed (e.g., bit per second) is less than or equal to a predesignated threshold transmission speed) so that it is difficult to transmit at least one image to the counterpart, the electronic device 101 according to an embodiment of the disclosure may display a third notification message 660 inquiring whether to transmit a message indicating that the current network state is unstable so that it is difficult to transmit at least one image to the counterpart, as illustrated in FIG. 6G. According to an embodiment of the disclosure, when the user selects a button (e.g., an OK button) included in the third notification message 660, the electronic device 101 may transmit a message indicating that it is difficult to transmit at least one image to the counterpart electronic device. According to an embodiment of the disclosure, when the user selects the first button 642, the electronic device 101 according to an embodiment of the disclosure may display a fourth notification message 670 inquiring the user about whether to transmit a message indicating that it is currently difficult to transmit a photo to the counterpart (e.g., James), as illustrated in FIG. 6H. According to an embodiment of the disclosure, when the user selects a button (e.g., an OK button) included in the fourth notification message 670, the electronic device 101 may transmit a message indicating that it is currently difficult to transmit a photo to the counterpart's electronic device to the counterpart's electronic device.

Figure 7:
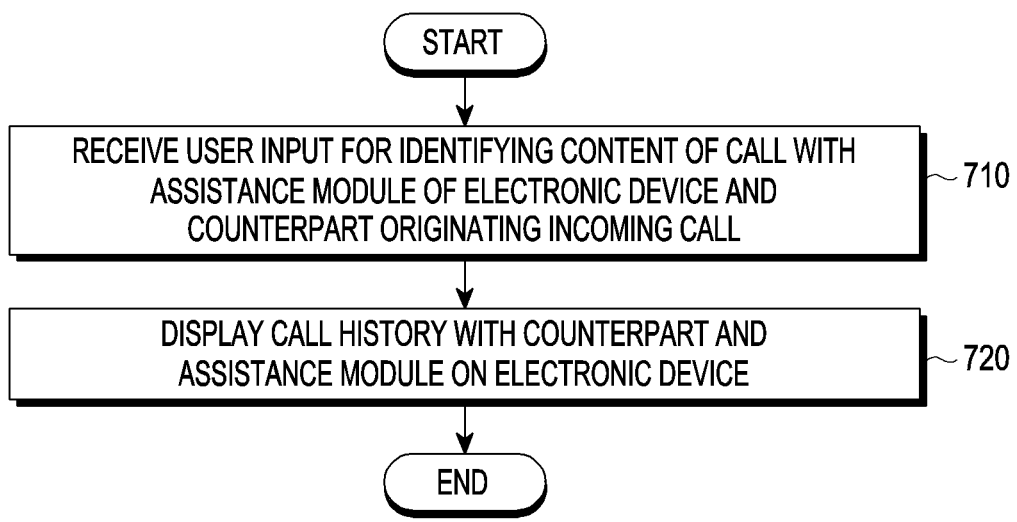
FIG. 7 is an example view illustrating a function or operation of displaying content of a call between a counterpart and an assistance module by an electronic device according to an embodiment of the disclosure.

FIG. 7 is an example view illustrating a function or operation of displaying content of a call between a counterpart and an assistance module 250 by an electronic device 101 according to an embodiment of the disclosure.

FIGS. 8A, 8B, 8C, 8D, and 8E are example views illustrating the function or operation described with reference to FIG. 7 in light of a user interface according to an embodiment of the disclosure.

Figure 8A:
FIGS. 8A, 8B, 8C, 8D, and 8E are example views illustrating the function or operation described with reference to FIG. 7 in light of a user interface according to an embodiment of the disclosure.
Figure 8B:
Figure 8C:
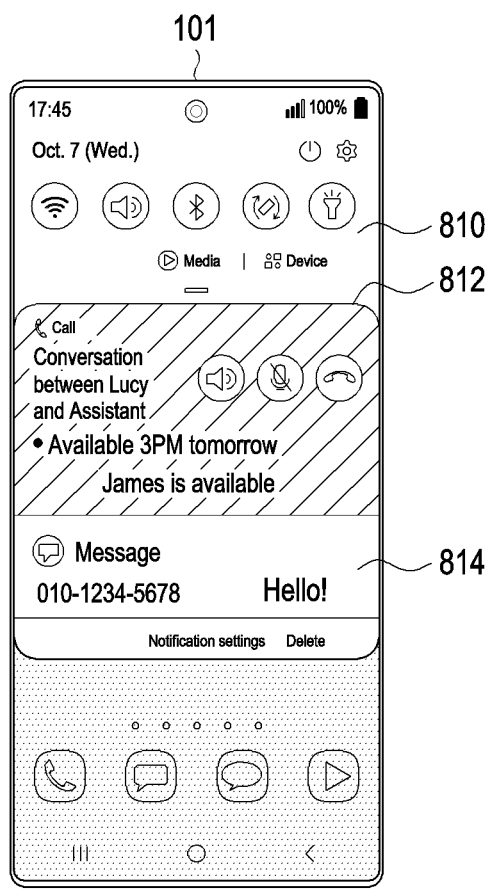
Figure 8D:
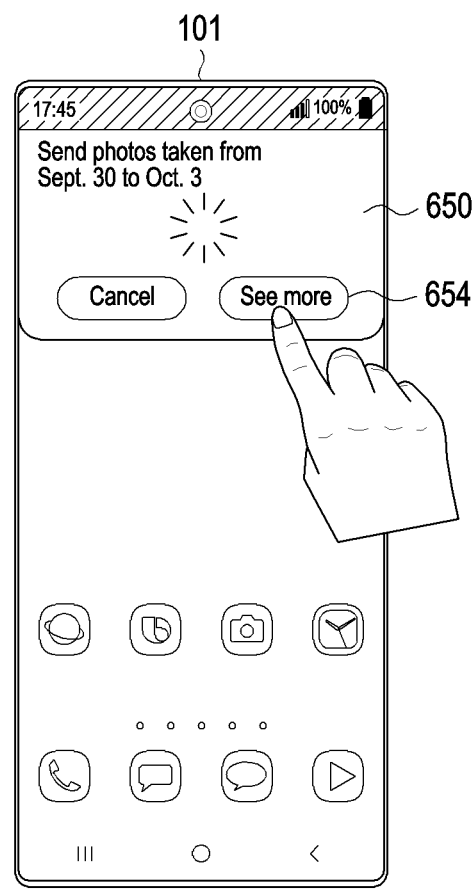

Referring to FIG. 7, in operation 710, the electronic device 101 according to an embodiment of the disclosure may receive a user input for identifying the content of a call between the counterpart originating the incoming call and the assistance module 250 of the electronic device 101. According to an embodiment of the disclosure, the user input for identifying the content of the call between the counterpart and the assistance module 250 of the electronic device 101 may include a selection input to a button 632 (e.g., a "detailed information" button) included in the message 630 indicating to start the call with the assistance module 250 as illustrated in FIG. 6A. According to an embodiment of the disclosure, the user input for identifying the content of the call between the counterpart and the assistance module 250 of the electronic device 101 may include a selection input to the fifth notification message 812 included in the quick panel 810. Referring to FIG. 8B, the electronic device 101 according to an embodiment of the disclosure may display the quick panel 810 when a swipe gesture downward from the status bar 634 is received from the user. The quick panel 810 according to an embodiment of the disclosure may include the fifth notification message 812 and/or a sixth notification message 814 notifying of an event (e.g., reception of a text message) occurring in relation to a specific application (e.g., the message application). Referring to FIG. 8D, the user input according to an embodiment of the disclosure may include a selection input to the third button 654 included in the second notification message 650. The fifth notification message 812 (e.g., the content of the conversation with the assistance module 250) according to an embodiment of the disclosure may be output after the call with the assistance module 250 is terminated, may be output when a specific event such as user's consent occurs, or may be output at a specific time interval after the call is started.

Figure 8E:
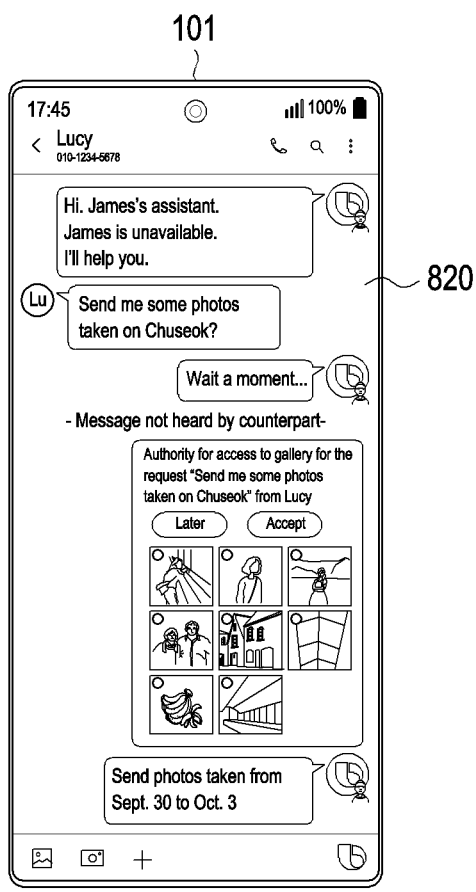

In operation 720, the electronic device 101 according to an embodiment of the disclosure may display the content of the call between the counterpart and the assistance module 250 on the electronic device 101. The electronic device 101 according to an embodiment of the disclosure may display an execution screen 820 of a specific application (e.g., a message application) on the electronic device 101 based on the reception of the user input according to operation 710. Referring to FIG. 8E, the execution screen 820 of the specific application according to an embodiment of the disclosure may include the content of the call between the counterpart and the assistance module 250. For example, according to an embodiment of the disclosure, if a selection input to the item 622 for starting a call with the assistance module 250 is received from the user of the electronic device 101, the electronic device 101 (e.g., the assistance module 250) according to an embodiment of the disclosure may transmit an utterance, "James's assistant. James is unavailable. I'll help you," to the electronic device of the counterpart originating the call. The electronic device 101 according to an embodiment of the disclosure may receive, from the counterpart (e.g., "Lu"), the utterance "Can you send me some photos taken by James on Chuseok?," wherein Chuseok is also known as Korean Thanksgiving. The electronic device 101 according to an embodiment of the disclosure may identify the utterance intent of the counterpart by analyzing the utterance of the counterpart. The electronic device 101 according to an embodiment of the disclosure may display, on the electronic device 101, that a user (e.g., James) authority is required to transmit an image taken during the Chuseok holiday. When the electronic device 101 according to an embodiment of the disclosure obtains the transmission authority from the user, the electronic device 101 may transmit an image taken during the Chuseok holiday period to the counterpart's electronic device. According to an embodiment of the disclosure, the "message not heard by the counterpart" illustrated in FIG. 8E may be displayed to be visually distinguished from other messages (e.g., messages heard by the counterpart). For example, according to an embodiment of the disclosure, the "message not heard by the counterpart" may be displayed in a different color from other messages.

Figure 9:
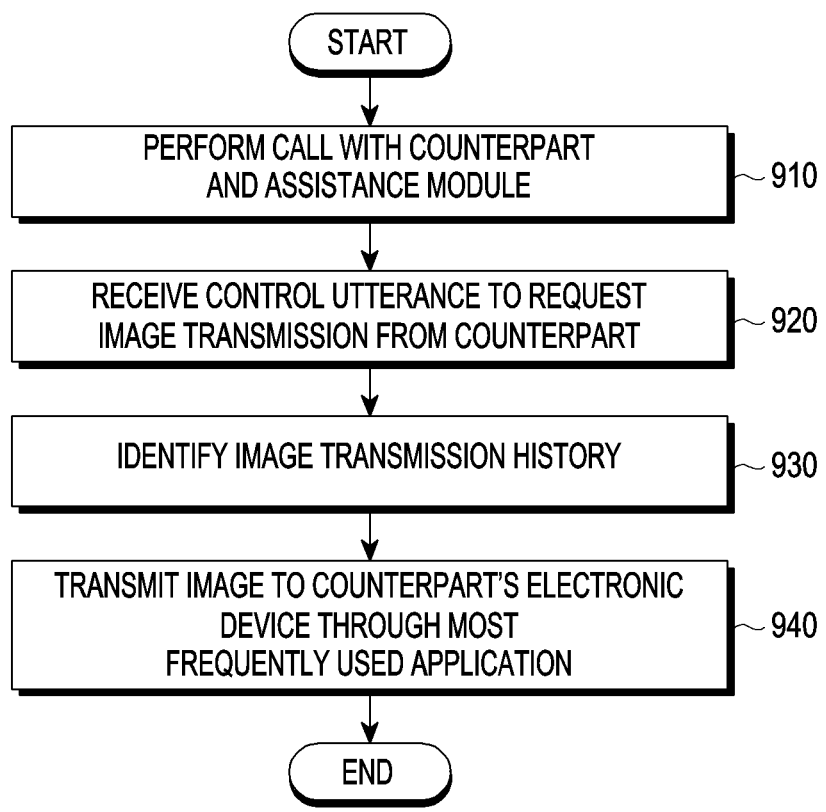
FIG. 9 is an example view illustrating a function or operation of transmitting, to a counterpart's electronic device, at least one image stored in an electronic device according to the counterpart's control utterance (e.g., an utterance for requesting image transmission) according to an embodiment of the disclosure.

FIG. 9 is an example view illustrating a function or operation of transmitting, to a counterpart's electronic device, at least one image stored in an electronic device according to the counterpart's control utterance (e.g., an utterance for requesting image transmission) according to an embodiment of the disclosure.

Figure 10A:
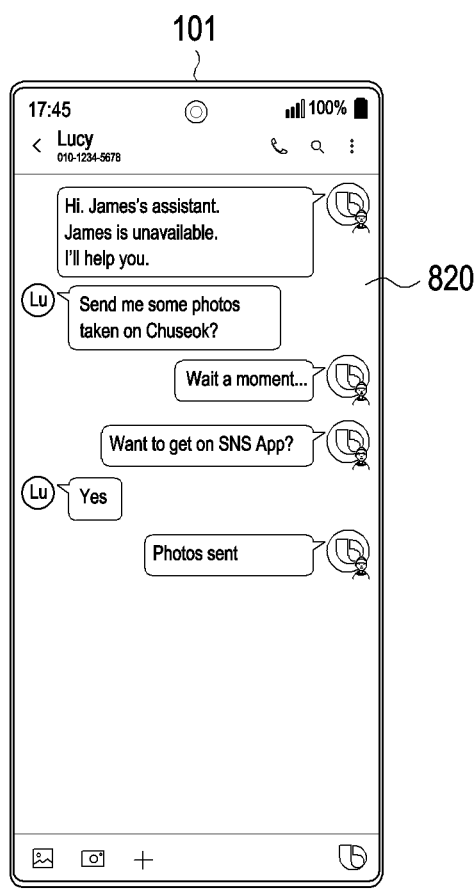
FIGS. 10A and 10B are example views illustrating the function or operation shown in FIG. 9 in light of a user interface according to an embodiment of the disclosure.
Figure 10B:
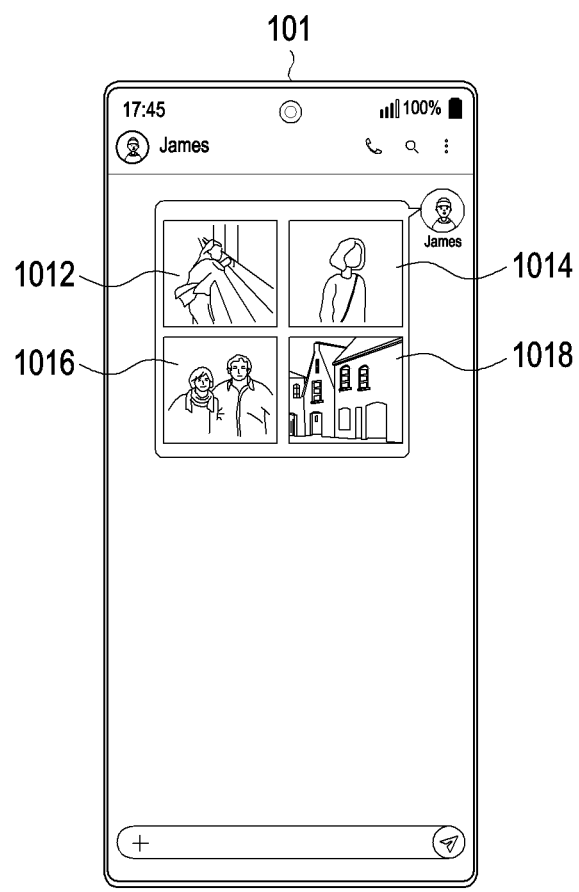

FIGS. 10A and 10B are example views illustrating the function or operation shown in FIG. 9 in light of a user interface according to an embodiment of the disclosure.

Referring to FIG. 9, in operation 910, the electronic device 101 according to an embodiment of the disclosure may perform a call with the counterpart and the assistance module 250. In operation 920, the electronic device 101 according to an embodiment of the disclosure may receive a control utterance (e.g., "Can you send me some photos taken on Chuseok?") requesting image transmission from the counterpart. The electronic device 101 according to an embodiment of the disclosure may identify an image transmission history in operation 930. For example, the electronic device 101 according to an embodiment of the disclosure may determine through which path image transmission/reception with the counterpart is performed (e.g., through which application the image transmission/reception is performed). In operation 940, the electronic device 101 according to an embodiment of the disclosure may transmit at least one image to the electronic device of the counterpart through the most frequently used application. Referring to FIG. 10A, the electronic device 101 according to an embodiment of the disclosure may receive a control utterance such as "Can you send me some photos taken on Chuseok?" from the counterpart (e.g., "Lu"). The electronic device 101 according to an embodiment of the disclosure may determine through which path image transmission/reception with the counterpart is performed. As a result of the determination, when it is determined that image transmission/reception has been performed most frequently through a specific SNS application, the electronic device 101 according to an embodiment of the disclosure may transmit an utterance such as "Do you want me to send them through the SNS application?" to the electronic device of the counterpart. FIG. 10B illustrates an embodiment in which, when a first image 1012, a second image 1014, a third image 1016, and a fourth image 1018 are transmitted through a specific SNS application, a history of transmission of the first image 1012, the second image 1014, the third image 1016, and the fourth image 1018 is displayed on an execution screen of the specific SNS application.

Figure 11:
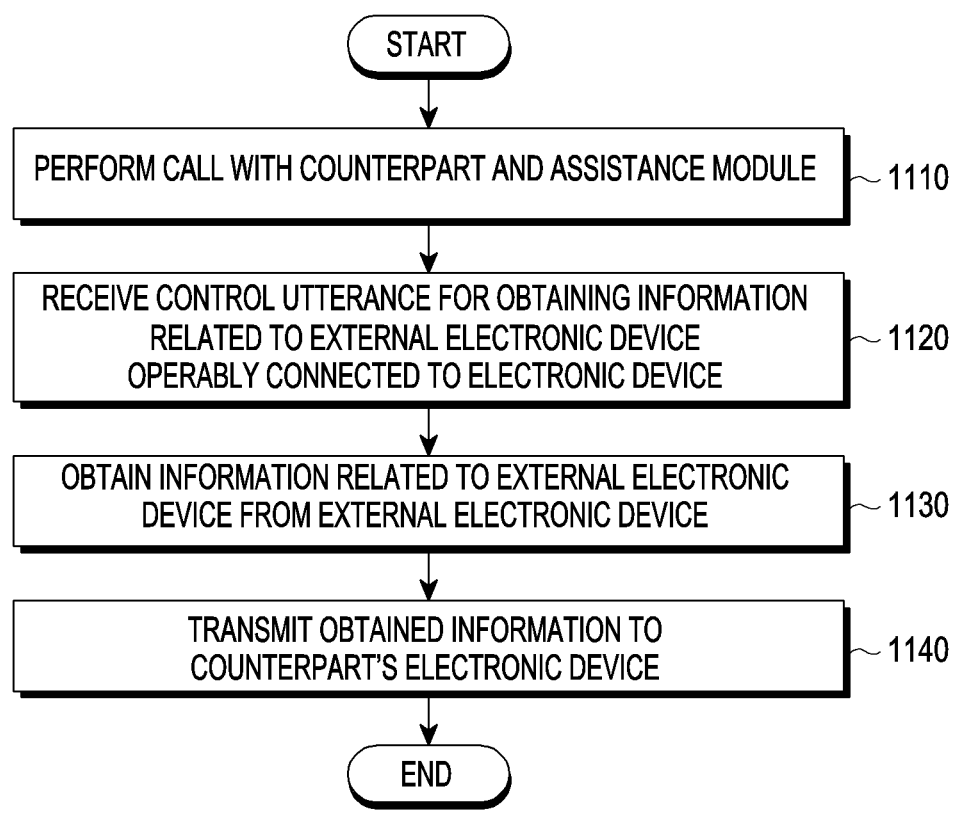
FIG. 11 is an example view illustrating a function or operation of obtaining information related to an external electronic device operably connected to an electronic device and transmitting it to a counterpart's electronic device according to the counterpart's control utterance (e.g., an utterance for requesting to transmit the information related to the external electronic device) according to an embodiment of the disclosure.

FIG. 11 is an example view illustrating a function or operation of obtaining information related to an external electronic device operably connected to an electronic device and transmitting it to a counterpart's electronic device according to the counterpart's control utterance (e.g., an utterance for requesting to transmit the information related to the external electronic device) according to an embodiment of the disclosure.

Figure 12A:
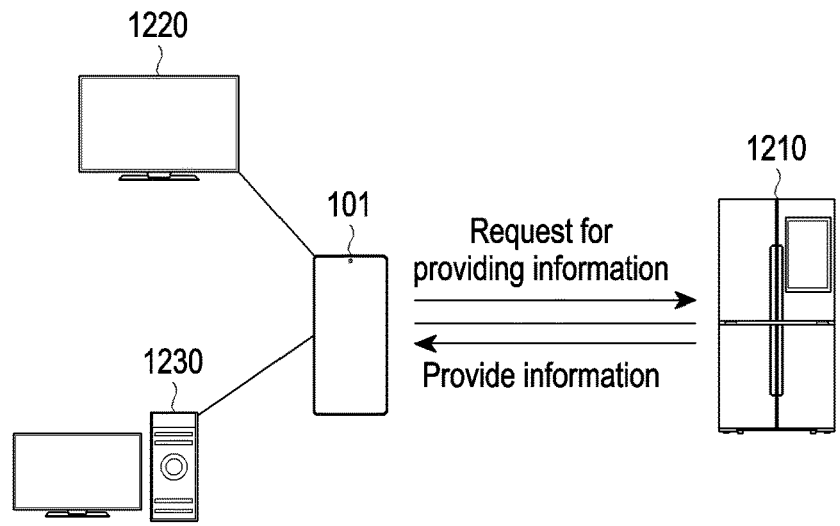
FIG. 12A is an example view illustrating a connection relationship between an electronic device and an external electronic device according to an embodiment of the disclosure.

FIG. 12A is an example view illustrating a connection relationship between an electronic device and an external electronic device according to an embodiment of the disclosure.

Figure 12B:
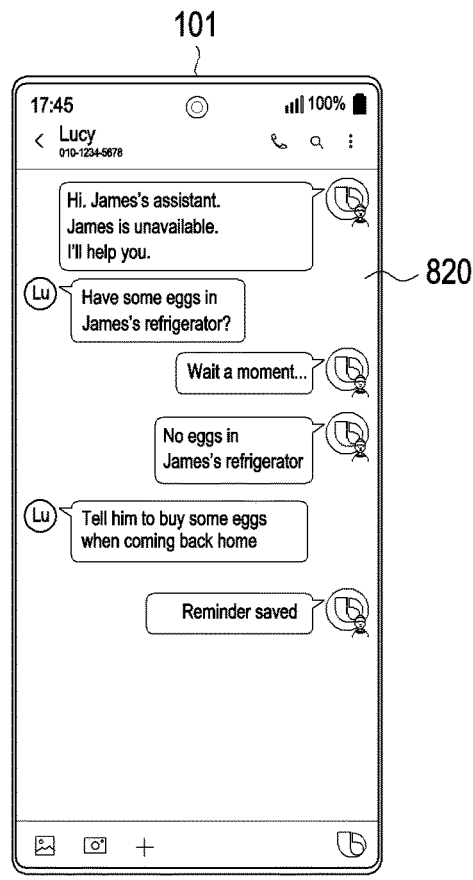
FIG. 12B is an example view illustrating the function or operation shown in FIG. 11 in light of a user interface according to an embodiment of the disclosure.

FIG. 12B is an example view illustrating the function or operation shown in FIG. 11 in light of a user interface according to an embodiment of the disclosure.

Referring to FIG. 11, in operation 1110, the electronic device 101 according to an embodiment of the disclosure may perform a call with the counterpart and the assistance module 250. In operation 1120, the electronic device 101 according to an embodiment of the disclosure may receive a control utterance for obtaining information related to an external electronic device operably connected to the electronic device 101. According to an embodiment of the disclosure, the control utterance for obtaining the information related to the external electronic device operably connected to the electronic device 101 may include, e.g., an utterance such as "Have some eggs in James's refrigerator?".

In operation 1130, the electronic device 101 according to an embodiment of the disclosure may obtain information related to the external electronic device from the external electronic device (e.g., the refrigerator 1210). Referring to FIG. 12A, the electronic device 101 according to an embodiment of the disclosure may be directly or indirectly (e.g., through a home server) connected to various external electronic devices (e.g., the refrigerator 1210, the TV 1220, and the PC 1230). When a control utterance such as "Have some eggs in James's refrigerator?" is received from the counterpart, the electronic device 101 according to an embodiment of the disclosure may transmit a request for providing information (e.g., whether there are currently eggs in the refrigerator 1210) according to the utterance intent of the counterpart to an external electronic device (e.g., the refrigerator 1210) included in the utterance of the counterpart. The electronic device 101 according to an embodiment of the disclosure may receive a response (e.g., currently no eggs) corresponding to the information provision request from the target external electronic device that has transmitted the information provision request.

The electronic device 101 according to an embodiment of the disclosure may transmit the obtained information to the counterpart's electronic device in operation 1140. For example, referring to FIG. 12B, the electronic device 101 according to an embodiment of the disclosure may transmit an utterance such as "James' refrigerator has no eggs" to the counterpart's electronic device. Referring to FIG. 12B, the electronic device 101 according to an embodiment of the disclosure may transmit the obtained information to the counterpart's electronic device, and then may receive an utterance such as "Tell me to buy some eggs when coming back home" from the counterpart. The electronic device 101 according to an embodiment of the disclosure may determine the utterance intent of the counterpart and then perform follow-up processing according to the utterance intent of the counterpart. For example, when an utterance such as "Tell me to buy some eggs when coming back home" is received from the counterpart, the electronic device 101 according to an embodiment of the disclosure may store the message "Buy some eggs when back home" in the reminder application. Further, the electronic device 101 according to an embodiment of the disclosure may store a notification setting such that a notification is output through the reminder application when the time when the user leaves work is reached. According to an embodiment of the disclosure, the time when the user leaves work may be a time pre-learned and stored by the electronic device 101.

Figure 13:
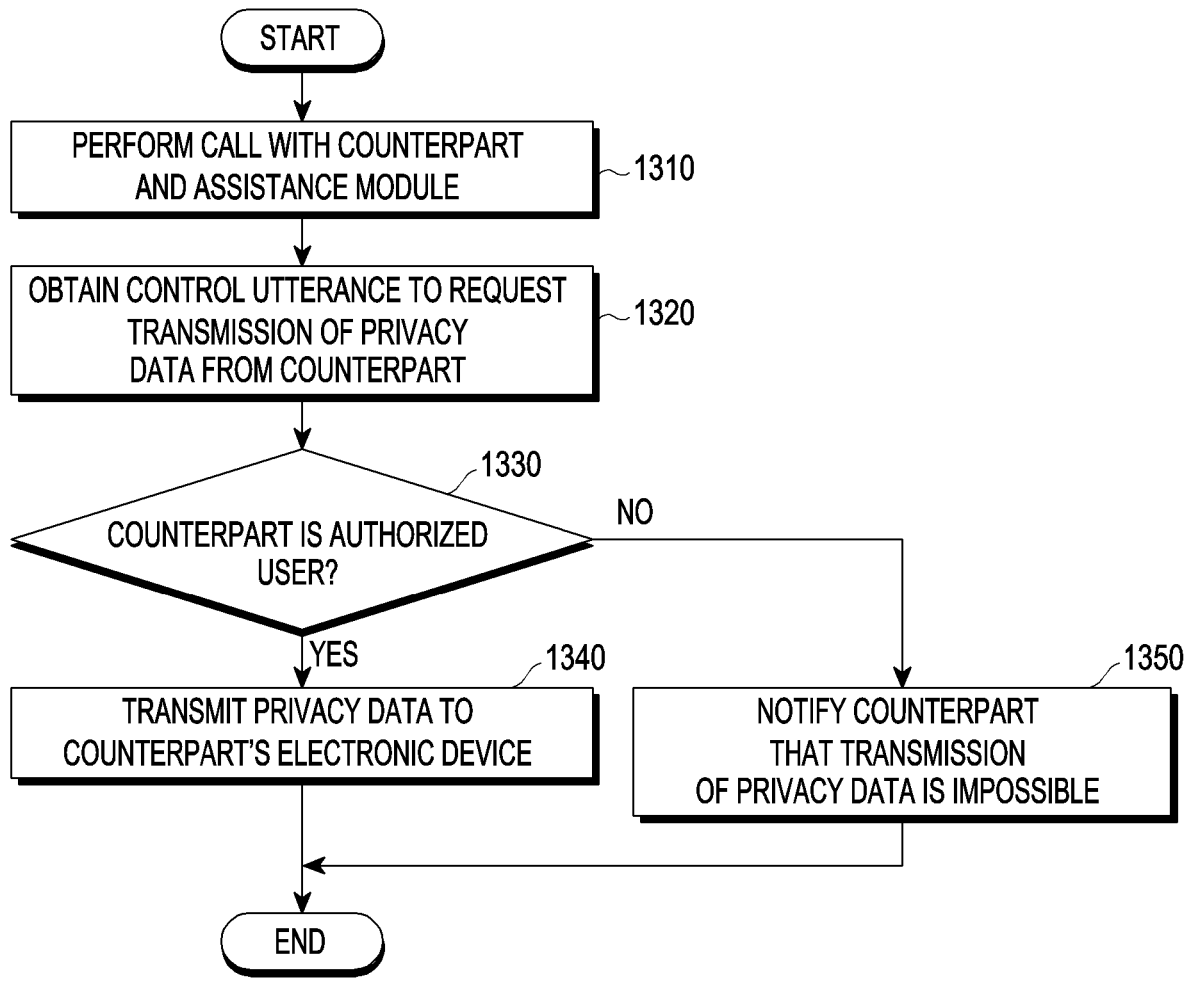
FIG. 13 is an example view illustrating a function or operation of transmitting privacy data to a counterpart's electronic device according to the counterpart's control utterance (e.g., an utterance for requesting to transmit privacy data) according to an embodiment of the disclosure.

FIG. 13 is an example view illustrating a function or operation of transmitting privacy data to a counterpart's electronic device according to the counterpart's control utterance (e.g., an utterance for requesting to transmit privacy data) according to an embodiment of the disclosure.

Figure 14A:
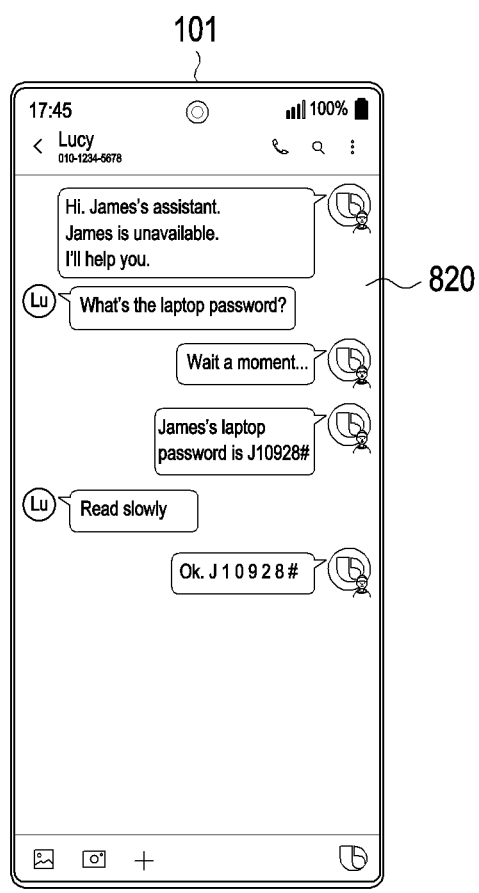
FIGS. 14A and 14B are example views illustrating the function or operation shown in FIG. 13 in light of a user interface according to an embodiment of the disclosure.
Figure 14B:
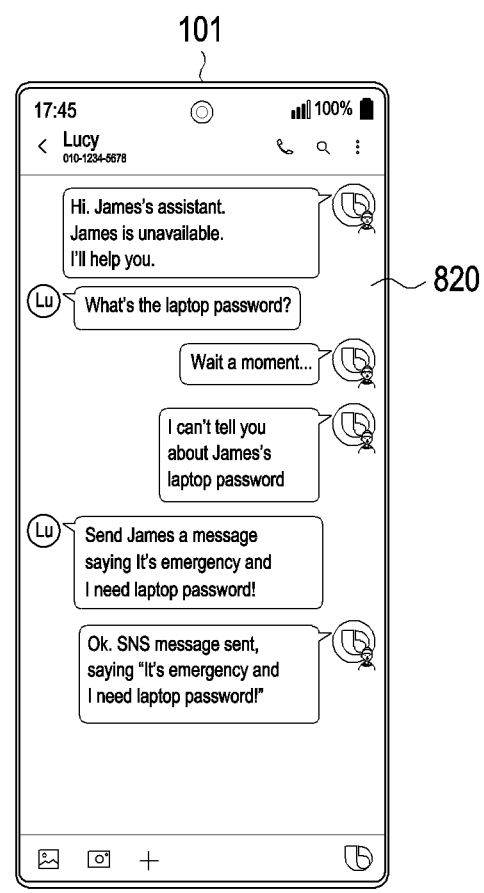

FIGS. 14A and 14B are example views illustrating the function or operation shown in FIG. 13 in light of a user interface according to an embodiment of the disclosure.

Referring to FIG. 13, in operation 1310, the electronic device 101 according to an embodiment of the disclosure may perform a call with the counterpart and the assistance module 250. In operation 1320, the electronic device 101 according to an embodiment of the disclosure may receive a control utterance (e.g., "What is the laptop password?") for requesting transmission of privacy data (e.g., a laptop password) from the counterpart. In the electronic device 101 according to an embodiment of the disclosure, the disclosure range of the privacy data may be preset by the user at the time of storing the privacy data. For example, when the utterance "The laptop password is J10928 #, and please disclose it only to Lucy" is received from the user through the assistance module 250, the electronic device 101 according to an embodiment of the disclosure may set and store the laptop password to be disclosed only to Lucy. The electronic device 101 according to an embodiment of the disclosure may identify an utterance such as "What is the laptop password?" as a control utterance for requesting privacy data, because the counterpart's utterance includes the word "password". Accordingly, the electronic device 1330 according to an embodiment of the disclosure may perform operation 1330.

In operation 1330, the electronic device 101 according to an embodiment of the disclosure may determine whether the counterpart is an authorized user. The electronic device 101 according to an embodiment of the disclosure may determine whether the counterpart is an authorized user, based on the disclosure range set in relation to the privacy data. For example, in a case where the laptop password is stored through the utterance "The laptop password is J10928 #, and please disclose it only to Lucy", if the request for providing the laptop password is received from Lucy, the electronic device 101 according to an embodiment of the disclosure may identify the counterpart (Lucy) as the authorized user. In other words, when the user stores the privacy data, the user who may share the privacy data may be designated by the user. The electronic device 101 according to an embodiment of the disclosure may determine whether the counterpart is an authorized user, based on the counterpart's group attribute (in other words, the counterpart's category) and/or contact history information with the counterpart stored in the contact application. For example, when the counterpart is a user stored in the "family" group, the electronic device 101 according to an embodiment of the disclosure may determine that the counterpart is an authorized user. Alternatively, when a call history with the counterpart is identified as a call history in which a predetermined number of or more calls have been made, the counterpart may be determined as an authorized user.

In operation 1340, when the counterpart is the authorized user, the electronic device 101 according to an embodiment of the disclosure may transmit privacy data to the counterpart's electronic device. For example, referring to FIG. 14A, the electronic device 101 may transmit an utterance including the laptop password to the counterpart (Lucy). In operation 1350, when the counterpart is not the authorized user, the electronic device 101 according to an embodiment of the disclosure may transmit, to the counterpart's electronic device, an utterance including the content that the privacy data may not be transmitted to the counterpart's electronic device. For example, referring to FIG. 14B, when the counterpart is not the authorized user (e.g., if Lucy is not the authorized user), an utterance such as "I can't tell you about James's laptop password" may be transmitted to the counterpart's electronic device.

Figure 15:
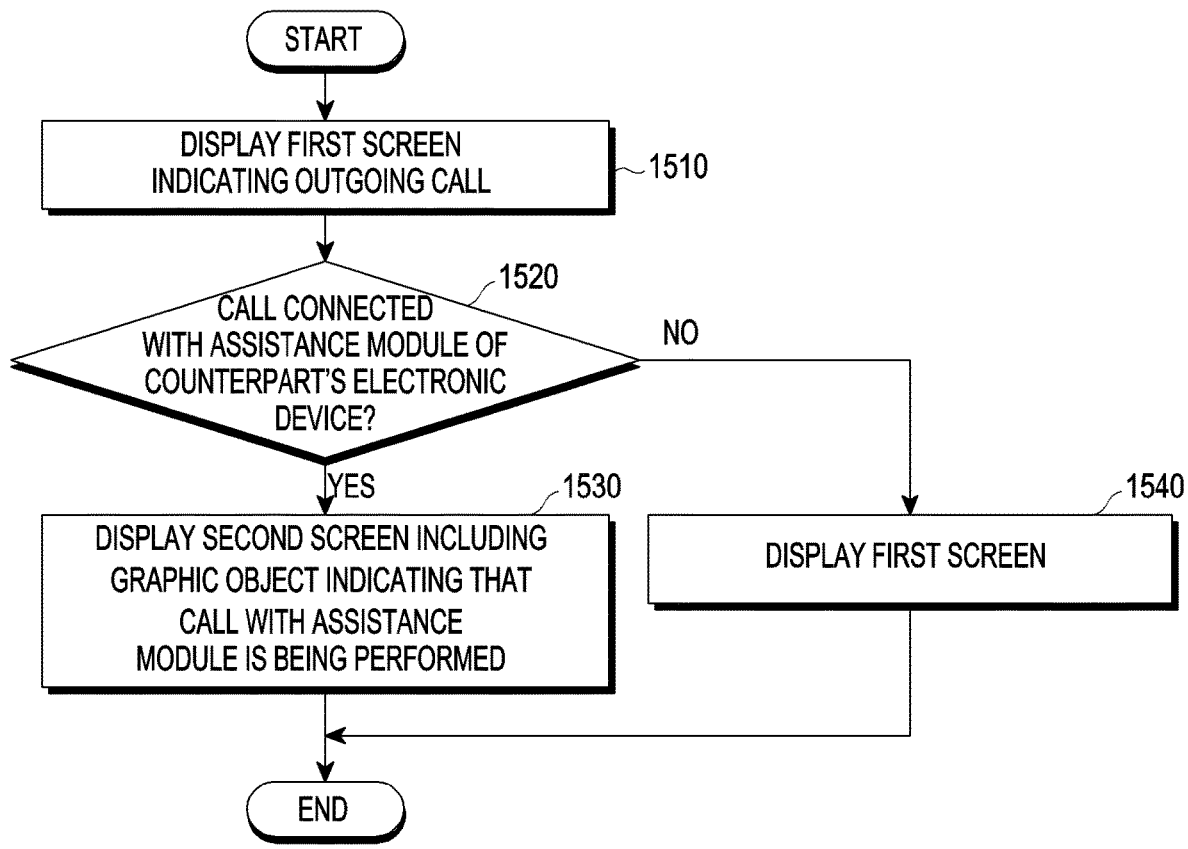
FIG. 15 is an example view illustrating a function or operation of switching a screen of a user originating a call from a first screen to a second screen when a counterpart originating a call performs a call with an assistance module according to an embodiment of the disclosure.

FIG. 15 is an example view illustrating a function or operation of switching a screen of a user originating a call from a first screen to a second screen when a counterpart originating a call performs a call with an assistance module according to an embodiment of the disclosure.

Figure 16A:
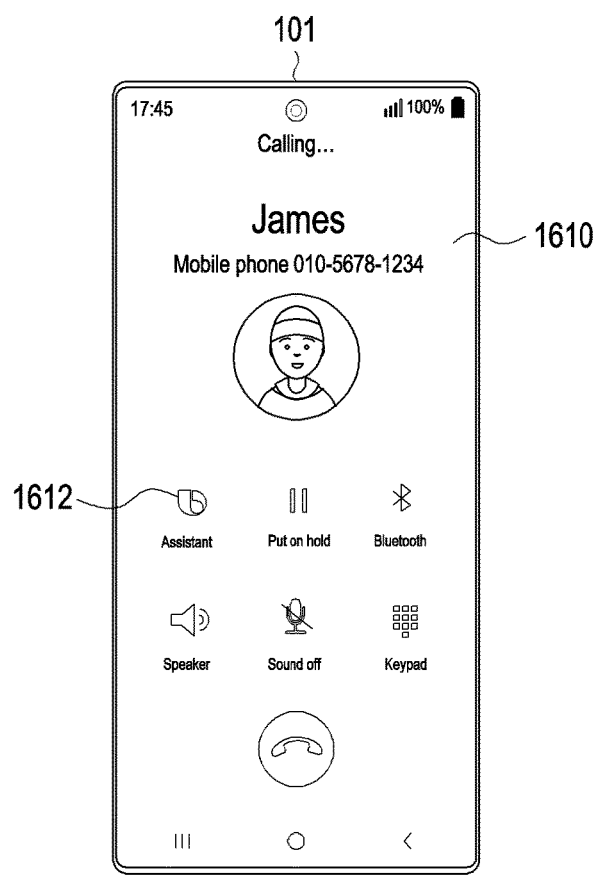
FIGS. 16A, 16B, and 16C are example views illustrating the function or operation shown in FIG. 15 in light of a user interface according to various embodiments of the disclosure.
Figure 16B:
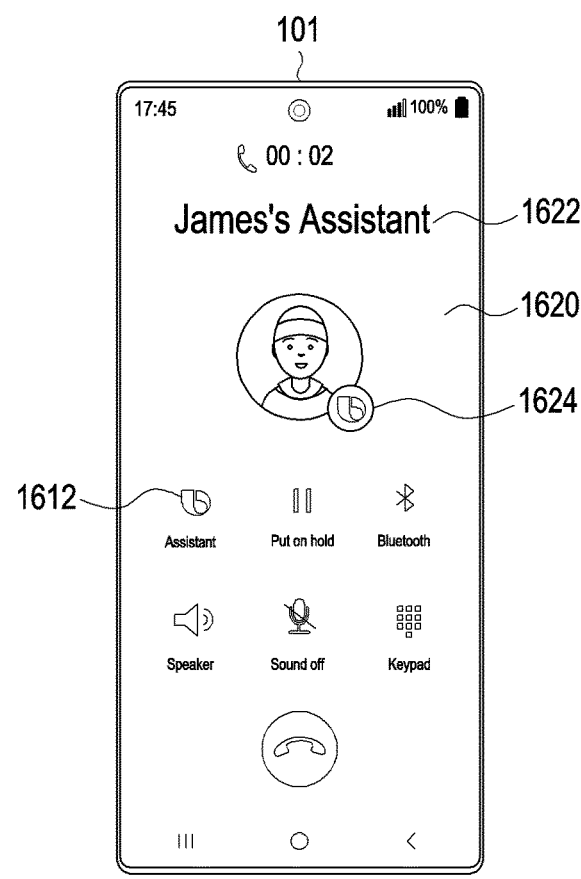
Figure 16C:
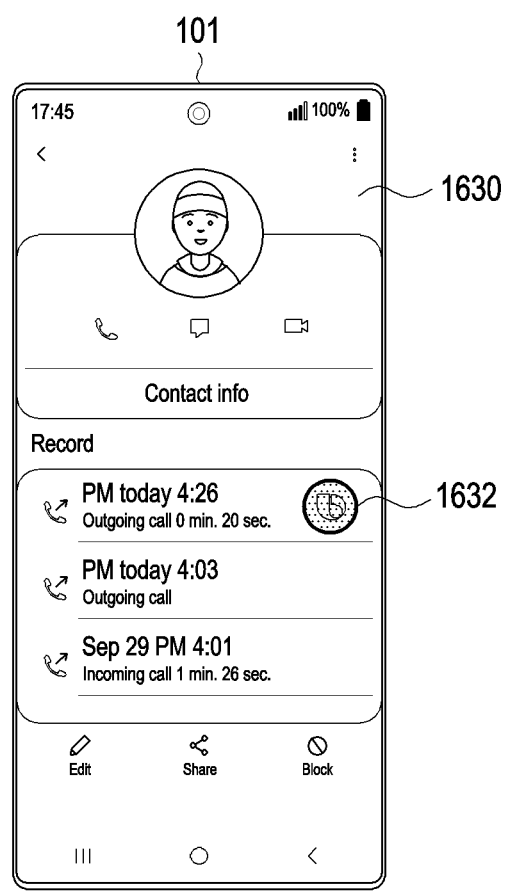

FIGS. 16A, 16B, and 16C are example views illustrating the function or operation shown in FIG. 15 in light of a user interface according to an embodiment of the disclosure.

Referring to FIG. 15, in operation 1510, an electronic device 101 (e.g., an electronic device of a caller (Lucy)) according to an embodiment of the disclosure may display a first screen 1610 indicating an outgoing call. Referring to FIG. 16A, the first screen 1610 according to an embodiment of the disclosure may include a button 1612 for performing a three-way call with the caller, the recipient, and the assistance module 250.

The electronic device 101 (e.g., the electronic device of the caller (Lucy)) according to the embodiment of the disclosure may determine whether the call connection is made to the assistance module 250 of the counterpart's electronic device in operation 1520. For example, the electronic device 101 according to an embodiment of the disclosure may determine that a call connection has been made to the assistance module 250 of the counterpart's electronic device when receiving a predesignated utterance (e.g., "James' assistant. I'll help you.") from the electronic device of the counterpart (e.g., the recipient) or receiving, from the counterpart's electronic device, a control signal indicating that the counterpart (e.g., recipient) selects an item 622 (e.g., "Receive through the Assistant") indicating whether the counterpart (e.g., recipient) is to perform a call with the assistance module 250.

In operation 1530, when a call is connected to the assistance module 250 of the counterpart electronic device, the electronic device 101 (e.g., the electronic device of the caller (Lucy)) according to an embodiment of the disclosure may display a second screen 1620 including a graphic object 1624 indicating that the call is being performed with the assistance module 250. Referring to FIG. 16B, the second screen 1620 according to an embodiment of the disclosure may include a name (e.g., James's Assistant) 1622 indicating the assistance module 250, a graphic object 1624 indicating that a call is being performed with the assistance module 250, and a button 1612 for performing a three-way call with the sender, the receiver, and the assistance module 250. According to an embodiment of the disclosure, when the electronic device 101 (e.g., the electronic device of the caller (Lucy)) is not call-connected to the assistance module 250 of the counterpart's electronic device (e.g., when the counterpart directly receives the call), the electronic device 101 may maintain the display of the first screen in operation 1540. According to an embodiment of the disclosure, when a call is performed with the assistance module 250 of the counterpart, an indicator 1632 indicating that the call has been performed with the assistance module 250 of the counterpart may be displayed on the third screen 1630 including the call history.

Figure 17:
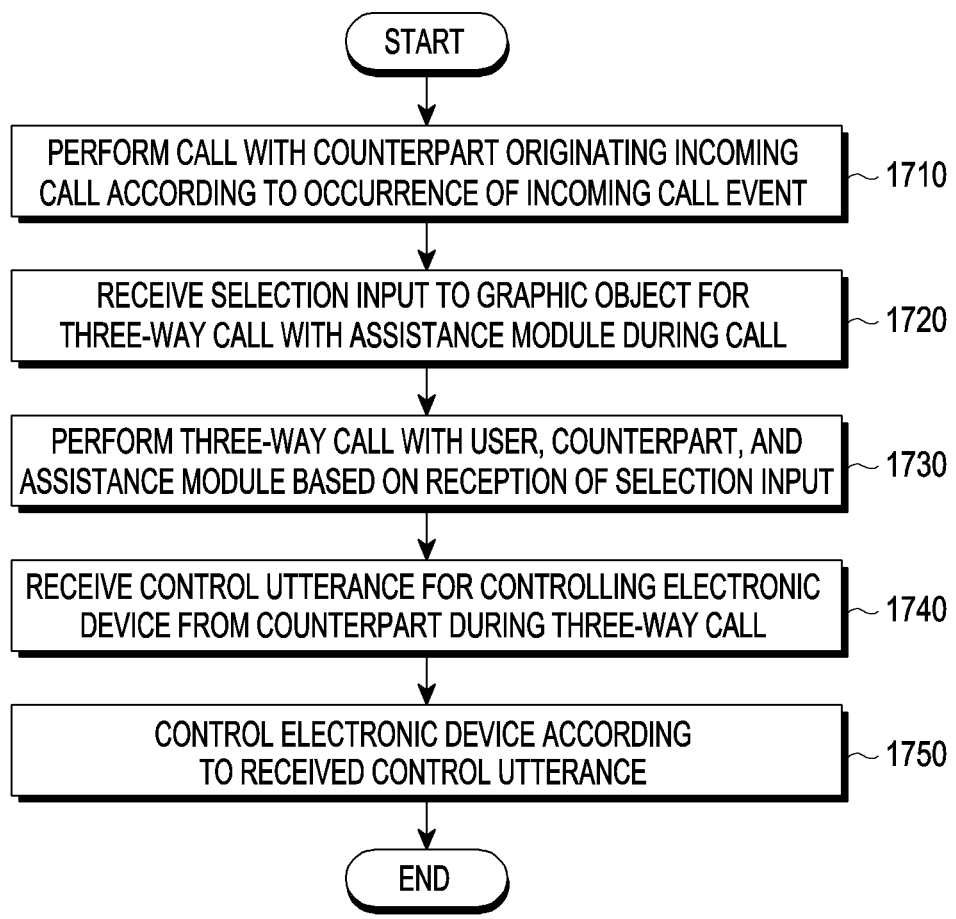
FIG. 17 is an example view illustrating a function or operation of performing a three-way call between an assistance module embedded in an electronic device, a counterpart, and a user of the electronic device during a call according to an embodiment of the disclosure.

FIG. 17 is an example view illustrating a function or operation of performing a three-way call between an assistance module embedded in an electronic device, a counterpart, and a user of the electronic device during a call according to an embodiment of the disclosure.

FIGS. 18A, 18B, 18C, 18D, and 18E are example views illustrating the function or operation shown in FIG. 17 in light of a user interface according to an embodiment of the disclosure.

Figures 18A, 18B:
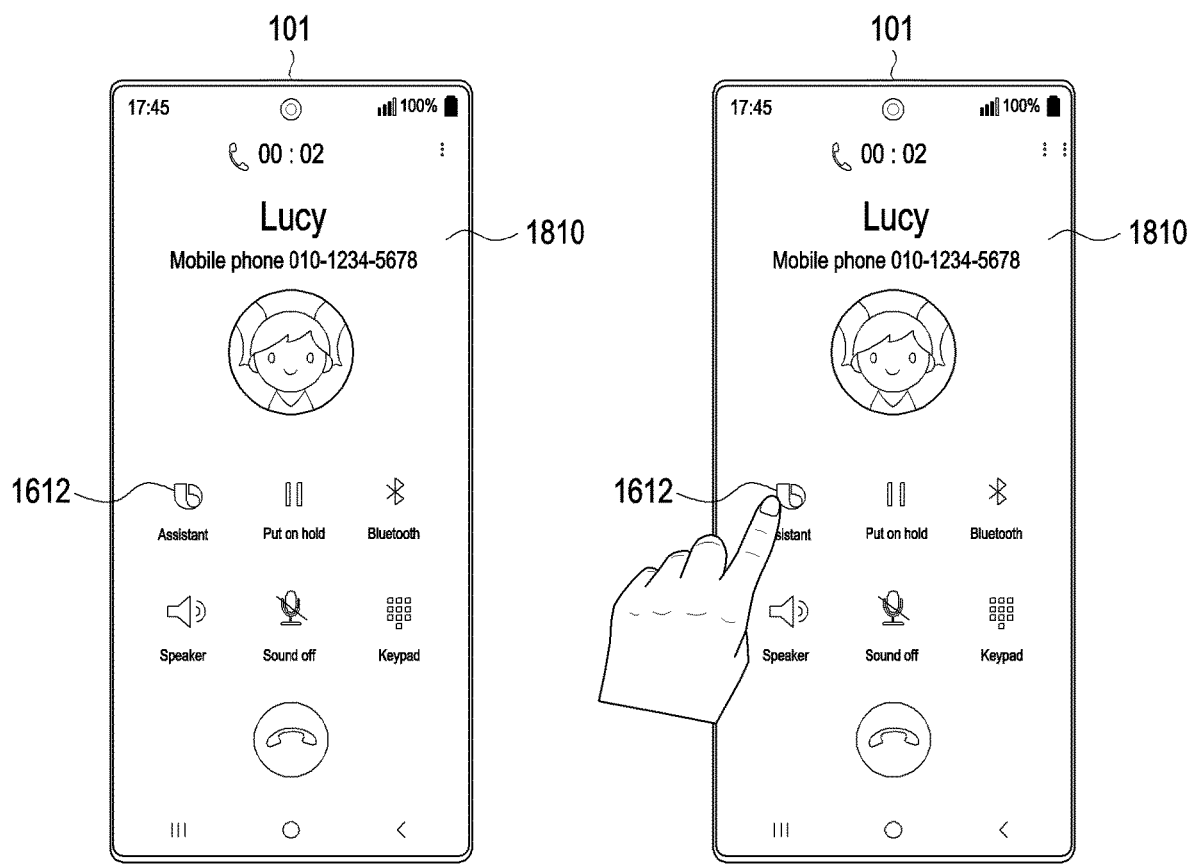
FIGS. 18A, 18B, 18C, 18D, and 18E are example views illustrating the function or operation shown in FIG. 17 in light of a user interface according to various embodiments of the disclosure.

Referring to FIG. 17, in operation 1710, the electronic device 101 according to an embodiment of the disclosure may perform a call with the counterpart that has originated the incoming call, according to the occurrence of the incoming call event. In operation 1720, the electronic device 101 according to an embodiment of the disclosure may receive a selection input to a graphic object (e.g., the button 1612) for a three-way call with the assistance module while performing the call. Referring to FIG. 18A, the button 1612 for performing a three-way call with the caller, the recipient, and an assistance module 250 may be displayed on the screen 1810 displayed on the electronic device 101 while performing the call. Referring to FIG. 18B, the electronic device 101 according to an embodiment of the disclosure may receive the user's touch input of selecting the button 1612 during a call with the counterpart.

Figure 18C:
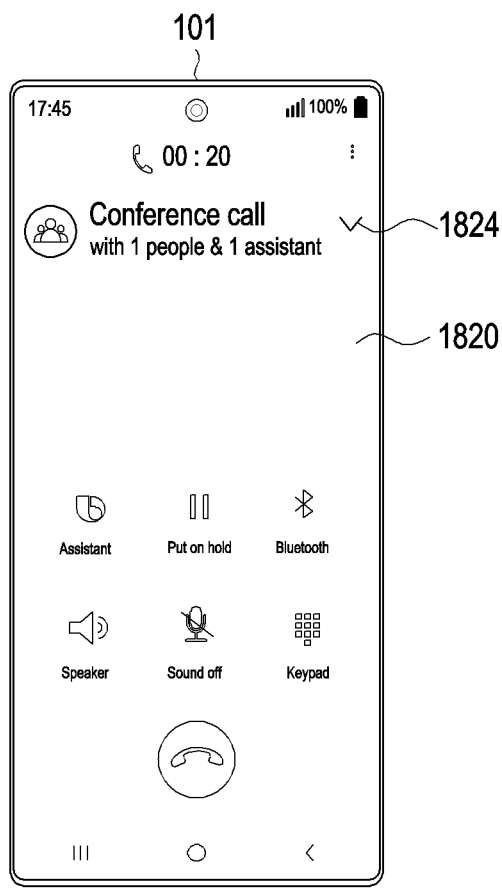
Figure 18D:
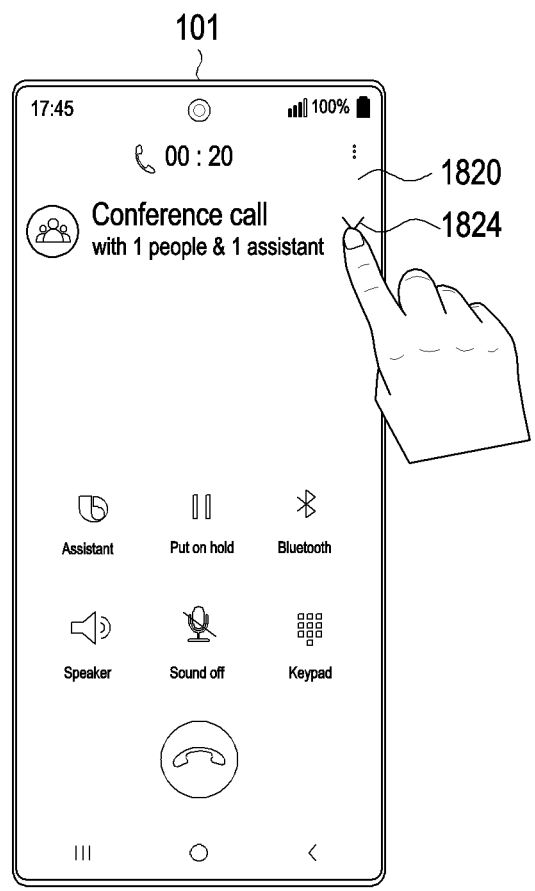
Figure 18E:
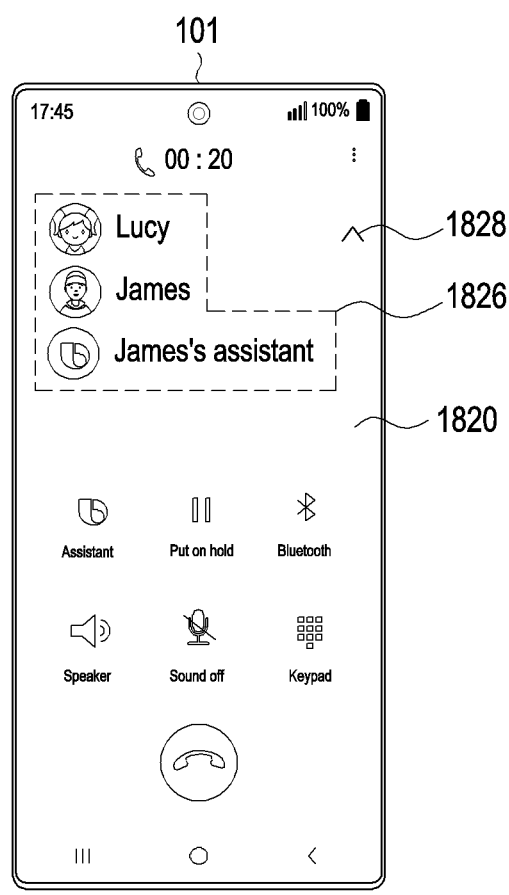

In operation 1730, the electronic device 101 according to an embodiment of the disclosure may perform a three-way call with the user, the counterpart, and the assistance module 250 based on the reception of the selection input. For example, when a user input to the button 1612 is received, the electronic device 101 according to an embodiment of the disclosure may perform a three-way call by executing the assistance module 250 (e.g., an intelligent app) in the background. According to an embodiment of the disclosure, a fourth screen 1820 indicating that the three-way call is being performed may be displayed on the electronic device 101 as illustrated in FIG. 18C while the three-way call is being performed. An expansion indicator 1824 may be displayed on the fourth screen 1820 according to an embodiment of the disclosure. Referring to FIG. 18D, when a selection input to the expansion indicator 1824 is received from the user, the electronic device 101 according to an embodiment of the disclosure may display a list 1826 of participants participating in the three-way call on the fourth screen 1820. The fourth screen 1820 according to an embodiment of the disclosure may include a reduction indicator 1828 for not displaying the list 1826 of participants participating in the three-way call.

In operation 1740, the electronic device 101 according to an embodiment of the disclosure may receive a control utterance for controlling the electronic device from the counterpart while the three-way call is being performed. The electronic device 101 according to an embodiment of the disclosure may control the electronic device 101 according to the received control utterance in operation 1750. For example, when receiving the utterance "Send me some photos taken on Chuseok" from the counterpart, the electronic device 101 may determine the Intent of the counterpart's utterance and transmit at least one image taken during the Chuseok holiday period to the counterpart's electronic device.

Figure 19:
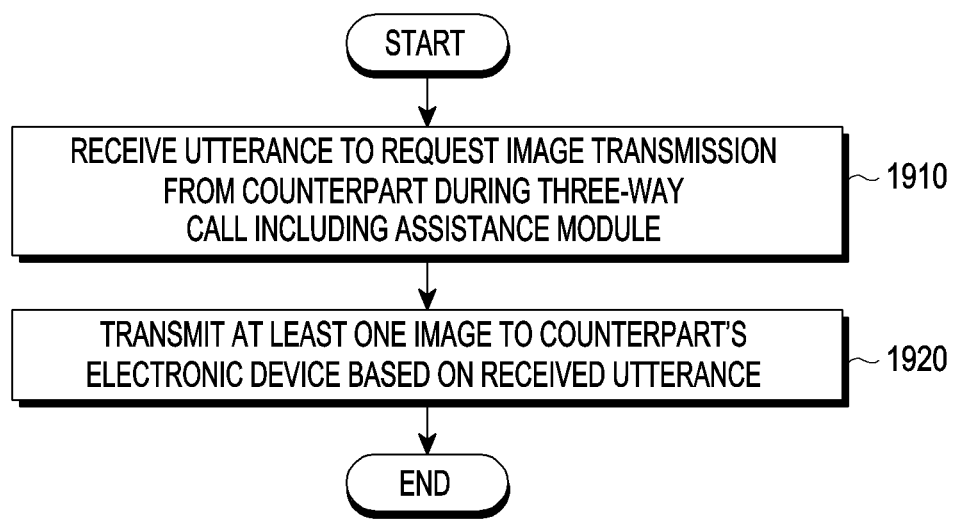
FIG. 19 is an example view illustrating a function or operation of transmitting, to a counterpart's electronic device, at least one image stored in an electronic device according to the counterpart's control utterance (e.g., an utterance for requesting image transmission) during a three-way call according to an embodiment of the disclosure.

FIG. 19 is an example view illustrating a function or operation of transmitting, to a counterpart's electronic device, at least one image stored in an electronic device 101 according to the counterpart's control utterance (e.g., an utterance for requesting image transmission) during a three-way call according to an embodiment of the disclosure.

Figure 20A:
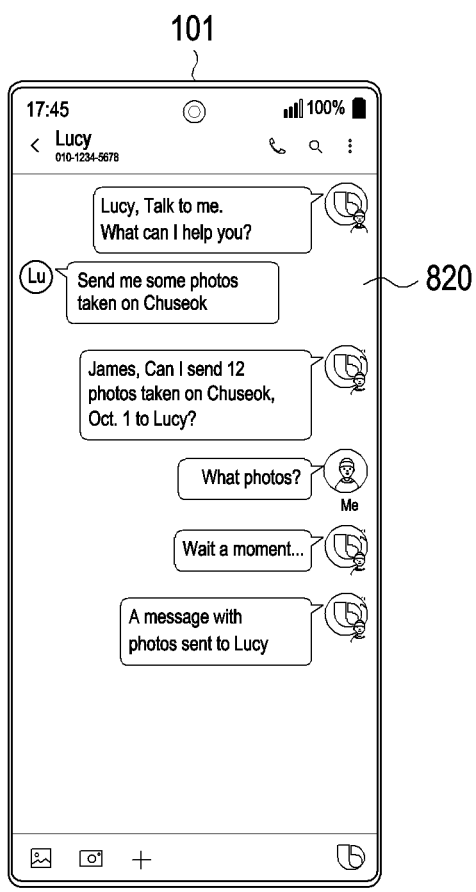
FIGS. 20A and 20B are example views illustrating the function or operation shown in FIG. 19 in light of a user interface according to various embodiments of the disclosure.
Figure 20B:
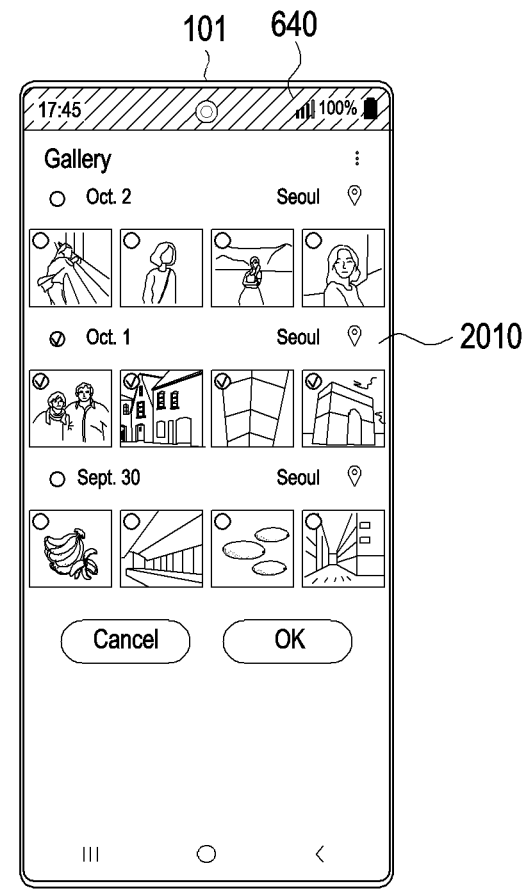

FIGS. 20A and 20B are example views illustrating the function or operation shown in FIG. 19 in light of a user interface according to an embodiment of the disclosure.

Referring to FIG. 19, in operation 1910, the electronic device 101 according to an embodiment of the disclosure may receive an utterance requesting image transmission from the counterpart during a three-way call including the assistance module 250. Referring to FIG. 20A, when the recipient selects the button 1612 during the call with the counterpart, the assistance module 250 (e.g., an intelligent app) may be executed to transmit, to the counterpart's electronic device, an utterance, such as "Lucy, talk to me. What can I do for you?". The electronic device 101 according to an embodiment of the disclosure may receive an utterance such as "Send me some photos taken on Chuseok" from the counterpart (Lucy).

The electronic device 101 according to an embodiment of the disclosure may transmit at least one image to the counterpart's electronic device based on the received utterance in operation 1920. When the electronic device 101 according to an embodiment of the disclosure receives an utterance such as "What photos?" from the user of the electronic device 101 through the microphone 220 as illustrated in FIG. 20A, the electronic device 101 may display an execution screen 2010 of a gallery application as illustrated in FIG. 19B to display at least one image to be transmitted. When a transmission request is received from the user (e.g., when a selection input to the button "OK" is received), the electronic device 101 according to an embodiment of the disclosure may transmit at least one selected image to the electronic device of the counterpart of the call through a specific application (e.g., a message application). In this case, the electronic device 101 according to an embodiment of the disclosure may output an utterance such as "I've sent a message to Lucy" through the speaker 210.

Figure 21:
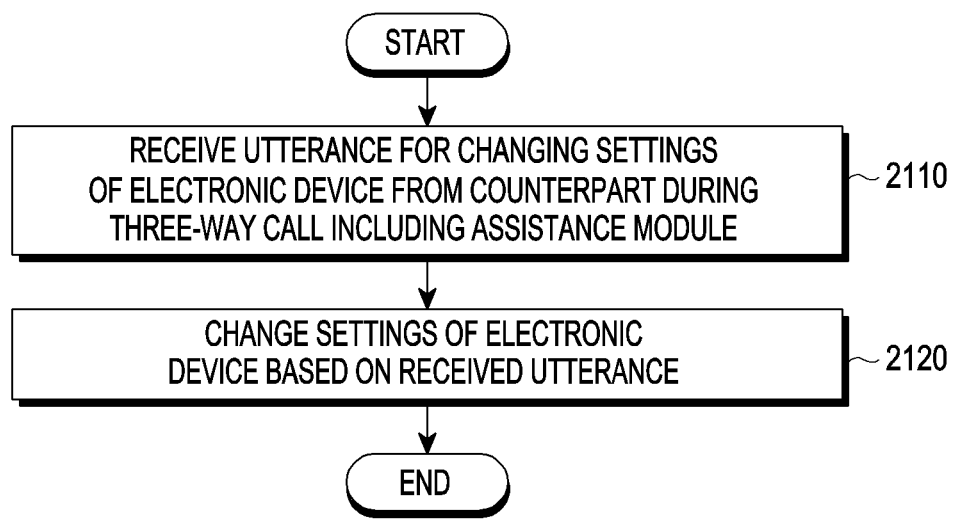
FIG. 21 is an example view illustrating a function or operation of changing the settings of an electronic device according to a counterpart's control utterance (e.g., an utterance for changing the settings of the electronic device) during a three-way call according to an embodiment of the disclosure.

FIG. 21 is an example view illustrating a function or operation of changing the settings of an electronic device according to a counterpart's control utterance (e.g., an utterance for changing the settings of the electronic device) during a three-way call according to an embodiment of the disclosure.

Figure 22A:
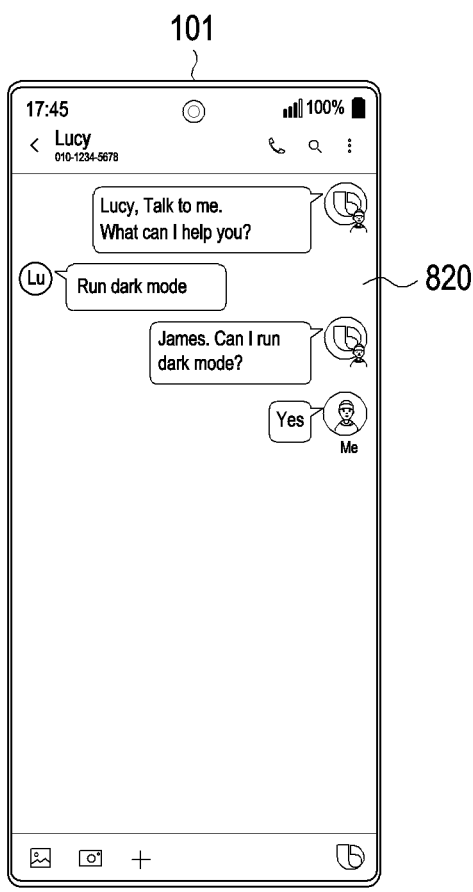
FIGS. 22A, 22B, and 22C are example views illustrating the function or operation shown in FIG. 21 in light of a user interface according to various embodiments of the disclosure.
Figure 22B:
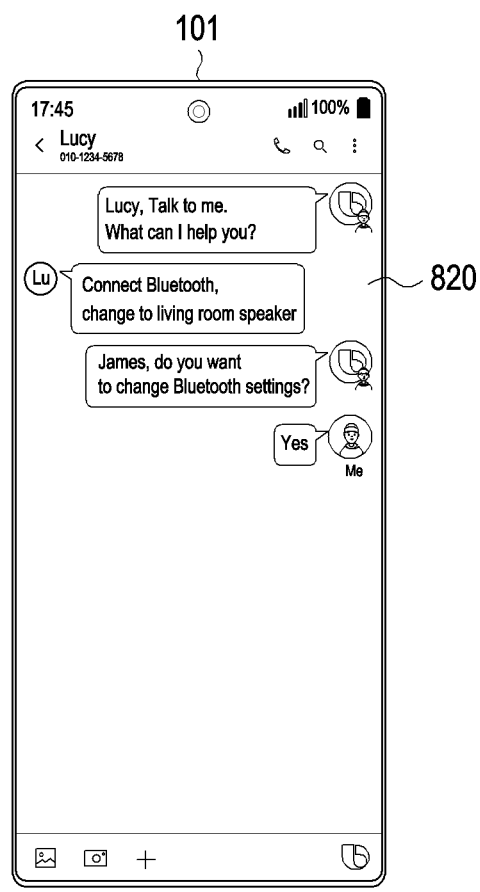
Figure 22C:
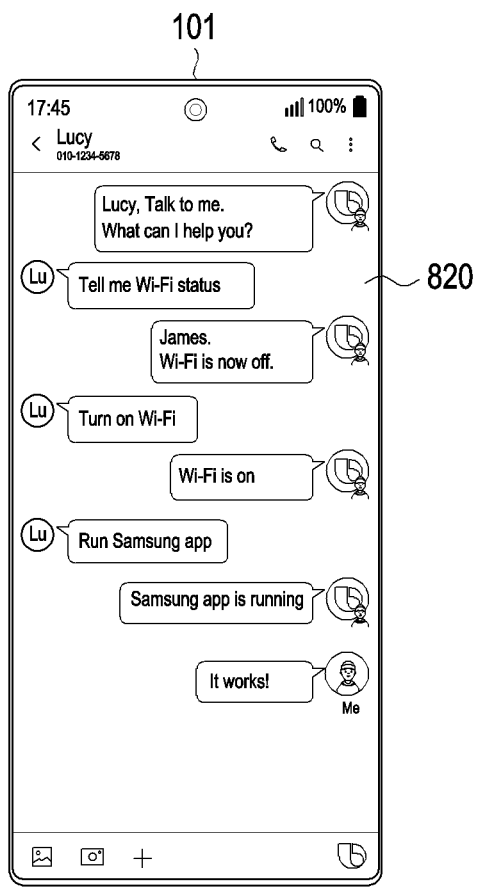

FIGS. 22A, 22B, and 22C are example views illustrating the function or operation shown in FIG. 21 in light of a user interface according to an embodiment of the disclosure.

Referring to FIG. 21, in operation 2110, the electronic device 101 according to an embodiment of the disclosure may receive an utterance for changing the settings of the electronic device 101 from the counterpart during a three-way call including the assistance module 250. In operation 2120, electronic device 101 according to an embodiment of the disclosure may change the settings of the electronic device 101 based on the received utterance. The utterance for changing the settings of the electronic device 101 may include, e.g., a user utterance (e.g., "Run dark mode") for executing "dark mode" as illustrated in FIG. 22A. Alternatively, the utterance for changing the settings of the electronic device 101 may include, e.g., a user utterance (e.g., "change Bluetooth connection to a living room speaker") for changing "Bluetooth settings" as illustrated in FIG. 22B. Alternatively, the utterance for changing the settings of the electronic device 101 may include, e.g., a user utterance (e.g., "Turn on Wi-Fi") for changing "Wi-Fi settings" as illustrated in FIG. 22C. According to an embodiment of the disclosure, in order to change the settings of the electronic device 101, the counterpart (Lucy) may be a user previously authorized through an utterance such as "Allow Lucy to change the settings of my mobile phone". According to an embodiment of the disclosure, as illustrated in FIG. 22C, the electronic device 101 may execute a specific application installed on the electronic device 101 through the user's control utterance (e.g., "Run Samsung App").

Figure 23:
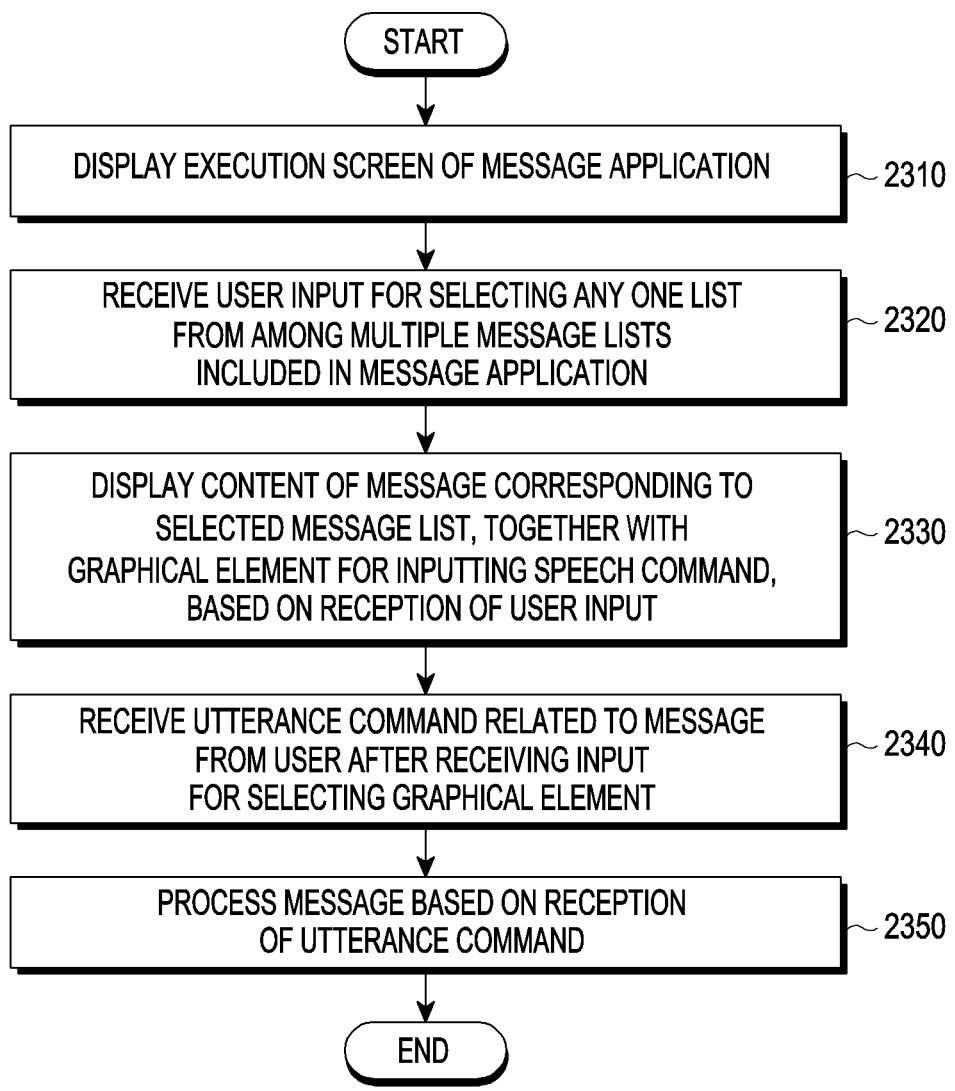
FIG. 23 is an example view illustrating a function or operation of processing a message according to a user's utterance according to an embodiment of the disclosure.

FIG. 23 is an example view illustrating a function or operation of processing a message according to a user's utterance according to an embodiment of the disclosure.

FIGS. 24A, 24B, 24C, and 24D are example views illustrating the function or operation shown in FIG. 23 in light of a user interface according to an embodiment of the disclosure.

Figures 24A, 24B:
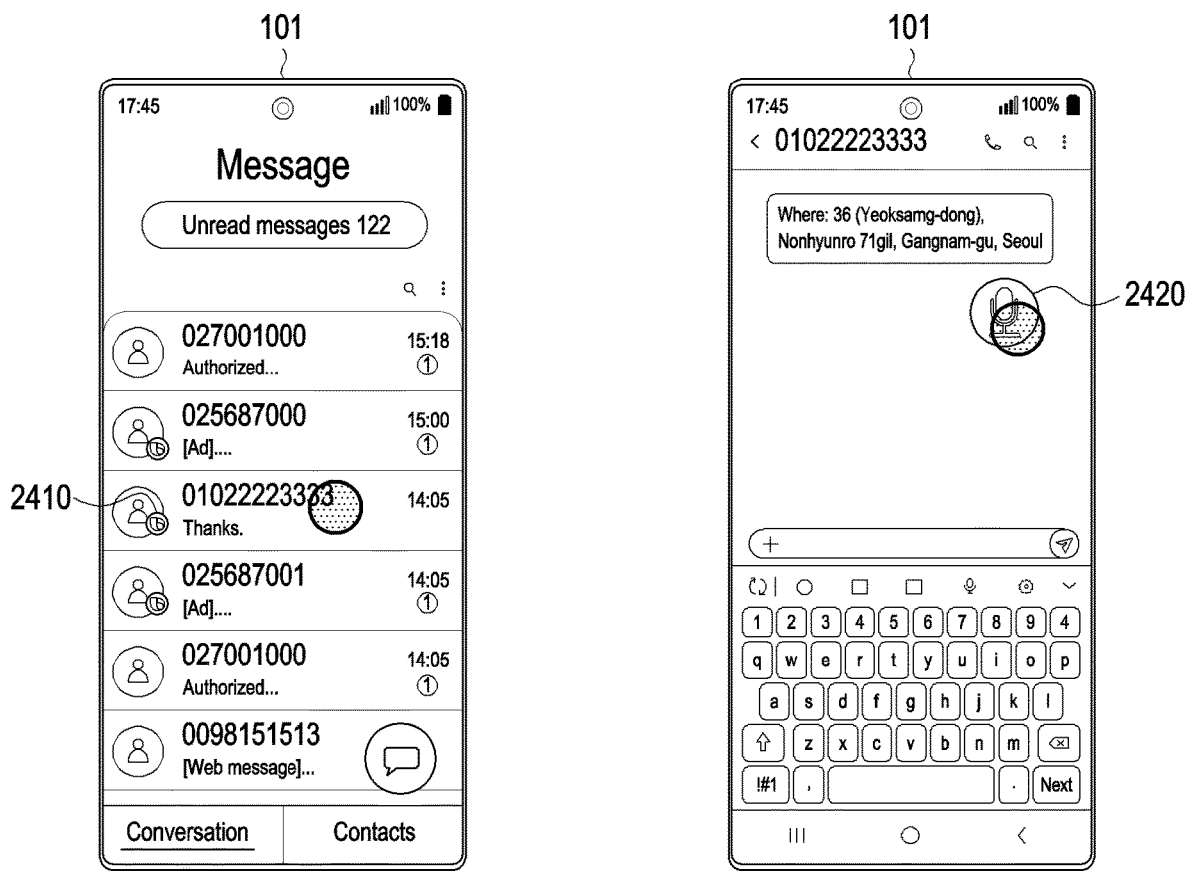
FIGS. 24A, 24B, 24C, and 24D are example views illustrating the function or operation shown in FIG. 23 in light of a user interface according to various embodiments of the disclosure.

Referring to FIG. 23, the electronic device 101 according to an embodiment of the disclosure may display a message application execution screen in operation 2310. FIG. 24A illustrates a state in which an execution screen of a message application is displayed on the electronic device 101. The execution screen of the message application may include a plurality of message lists including messages transmitted and received to/from a plurality of counterparts. According to an embodiment of the disclosure, when a message is transmitted or received with the assistance module 250 of the counterpart, as illustrated in FIG. 24A, a first indicator 2410 indicating that the message has been transmitted or received or is being transmitted or received with the assistance module 250 of the counterpart may be displayed. According to an embodiment of the disclosure, the electronic device 101 (e.g., the assistance module 250) may parse the message transmitted from the counterpart, identify the content of the message, and transmit a response thereto to the counterpart.

In operation 2320, the electronic device 101 according to an embodiment of the disclosure may receive a user input for selecting any one of a plurality of message lists included in the message application. Referring to FIG. 24A, the electronic device 101 according to an embodiment of the disclosure may receive a user input for selecting any one message list.

In operation 2330, the electronic device 101 according to an embodiment of the disclosure may display the content of the message corresponding to the selected message list, together with a graphical element 2420 for inputting the speech command, based on the reception of the user input. Referring to FIG. 24B, the electronic device 101 according to an embodiment of the disclosure may display the content of the message corresponding to the selected message list, together with a graphical element 2420 for inputting the speech command, based on reception of the user input.

Figure 24C:
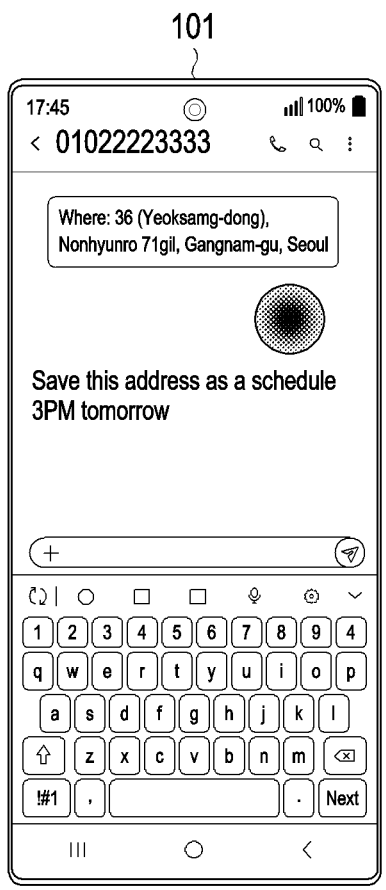
Figure 24D:
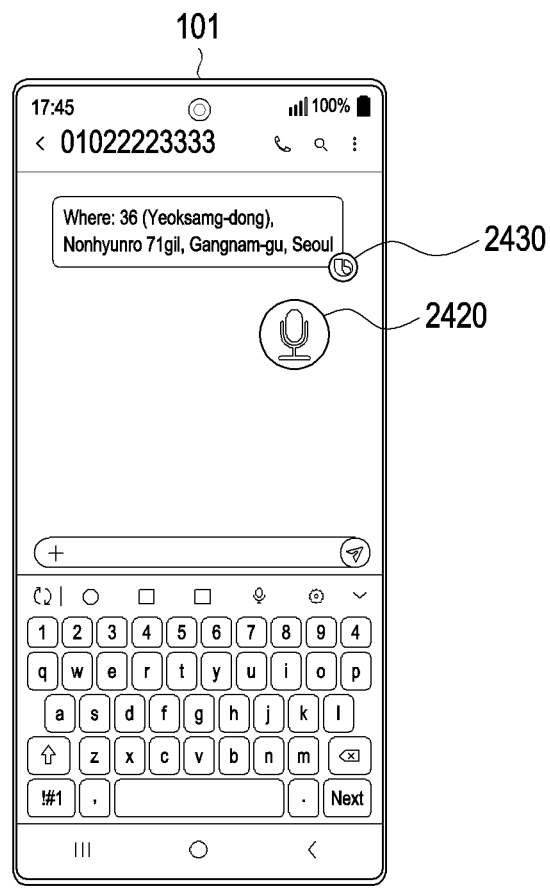

In operation 2340, the electronic device 101 according to an embodiment of the disclosure may receive an utterance command related to the message from the user after receiving an input for selecting the graphical element. Referring to FIG. 24C, the electronic device 101 according to an embodiment of the disclosure may receive an utterance such as "Save this address as a schedule 3 PM tomorrow." In operation 2350, the electronic device 101 according to an embodiment of the disclosure may process the message based on reception of the utterance command. For example, the electronic device 101 according to an embodiment of the disclosure may store the content (e.g., address) of the text message together with the schedule previously stored in a specific application (e.g., schedule application) according to a user utterance such as "Save this address as a schedule 3 PM tomorrow". The electronic device 101 according to an embodiment of the disclosure may display a second indicator 2430 around the content of the text message processed according to the user utterance, as illustrated in FIG. 24D.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a touchscreen display;
   memory storing one or more computer programs; and
   one or more processors communicatively coupled to the touchscreen display and the memory,
   wherein the one or more computer programs include computer-executable instructions that, when executed by the one or more processors individually or collectively, cause the electronic device to:
   detect an occurrence of an incoming call,
   based on the occurrence of the incoming call, display, through the touchscreen display, a notification indicating whether to perform a call with a first application installed on the electronic device,
   while the incoming call is being detected, obtain, through the touchscreen display, a first user input with respect to the notification,
   based on the first user input, execute the first application for performing the call with a counterpart that originated the incoming call,
   perform, by processing an utterance from the counterpart using the first application on the electronic device, the call with the counterpart,
   detect a first utterance from the counterpart,
   based on the detection of the first utterance of the counterpart, identify an intention of the first utterance from the counterpart,
   when the intention of the first utterance is identified as a request to access information of the electronic device:
   display, through the touchscreen display, a user interface requesting acceptance for accessing information of the electronic device according to the first utterance, and
   when the acceptance of the first utterance is received through the user interface, transmit, through a second application determined based on transmission history information with respect to the counterpart, data corresponding to the accepted information of the electronic device according to the acceptance to the counterpart.

2. The electronic device of claim 1, wherein the one or more computer programs further include computer-executable instructions that, when executed by one or more processors individually or collectively, cause the electronic device to display during the call a first indicator indicating that the call with an assistance module is in progress.

3. The electronic device of claim 1, further comprising:
   at least one speaker, wherein the one or more computer programs further include computer-executable instructions that, when executed by one or more processors individually or collectively, cause the electronic device to control the at least one speaker to not output, through the at least one speaker, the call with the counterpart.

4. The electronic device of claim 1, wherein the one or more computer programs further include computer-executable instructions that, when executed by one or more processors individually or collectively, cause the electronic device to:
display a notification indicating that the counterpart is performing the call with an assistance module, and
display a screen including content of the call between the counterpart and the assistance module, based on another selection input that is made to the notification.

5. The electronic device of claim 1, wherein a second indicator indicating that the call with an assistance module is in progress is displayed on another electronic device that is used by the counterpart.

6. The electronic device of claim 1, wherein the first utterance includes an utterance to enable at least one image stored in the electronic device to be transmitted to another electronic device that is used by the counterpart.

7. The electronic device of claim 1, wherein the first utterance includes an utterance to enable information related to an external electronic device operably connected to the electronic device to be transmitted another electronic device that is used by the counterpart.

8. The electronic device of claim 1, wherein the first utterance includes an utterance to enable privacy data stored in the electronic device to be transmitted to an external electronic device that is used by the counterpart.

9. An electronic device comprising:
at least one speaker;
a touchscreen display;
memory storing one or more computer programs; and
one or more processors communicatively coupled to the at least one speaker, the touchscreen display and the memory,
wherein the one or more computer programs include computer-executable instructions that, when executed by the one or more processors individually or collectively, cause the electronic device to:
detect an occurrence of an incoming call,
perform a call with a counterpart that originated the incoming call based on the occurrence of the incoming call, wherein a call screen indicating that the call is in progress is displayed during the call, and a graphic object for a three-way call with a first application installed on the electronic device is included in the call screen,
perform the three-way call in response to a selection input to the graphic object that is received during the call, wherein an utterance by the first application during the three-way call and is output through the at least one speaker, and
detect a first utterance from the counterpart,
based on the detection of the first utterance of the counterpart, identify an intention of the first utterance from the counterpart,
when the intention of the first utterance is identified as a request to access information of the electronic device:
display, through the touchscreen display, a user interface requesting acceptance for accessing information of the electronic device according to the first utterance, and
when the acceptance of the first utterance is received through the user interface, transmit, through a second application determined based on transmission history information with respect to the counterpart, data corresponding to the accepted information of the electronic device according to the acceptance to the counterpart.

10. The electronic device of claim 9, wherein the first utterance includes an utterance to enable a setting of the electronic device to be changed from a first setting to a second setting.

11. The electronic device of claim 10, wherein the setting includes a setting related to a screen display state of the electronic device.

12. The electronic device of claim 10, wherein the setting includes a setting related to short-range communication or long-range communication.

13. The electronic device of claim 9, wherein the one or more computer programs further include computer-executable instructions that, when executed by one or more processors individually or collectively, cause the electronic device to display during the call a first indicator indicating that the call with an assistance module is in progress.

14. The electronic device of claim 9, wherein the one or more computer programs further include computer-executable instructions that, when executed by one or more processors individually or collectively, cause the electronic device to:
display a notification indicating that the counterpart is performing the call with an assistance module; and
display a screen including content of the call between the counterpart and the assistance module, based on another selection input that is made to the notification.

15. The electronic device of claim 9, wherein a second indicator indicating that the call with an assistance module is in progress is displayed on another electronic device that is used by the counterpart.

16. The electronic device of claim 1, wherein the one or more computer programs further include computer-executable instructions that, when executed by one or more processors individually or collectively, cause the electronic device to in case that a delay of acceptance of the first utterance is received via the user interface, control the electronic device to delay performance of the first utterance.

17. A non-transitory storage medium storing one or more programs, the one or more computer programs comprising computer-executable instructions, when executed by one or more processors of an electronic device individually or collectively, cause the electronic device to:
detect an occurrence of an incoming call,
based on the occurrence of the incoming call, display, through a touchscreen display of the electronic device, a notification indicating whether to perform a call with a first application installed on the electronic device,
while the incoming call is being detected, obtain, through the touchscreen display, a first user input with respect to the notification,
based on the first user input, execute the first application for performing the call with a counterpart that originated the incoming call,
perform, by processing an utterance from the counterpart using the first application on the electronic device, the call with the counterpart, detect a first utterance from the counterpart, based on the detection of the first utterance of the counterpart, identify an intention of the first utterance from the counterpart, when the intention of the first utterance is identified as a request to access information of the electronic device:

display, through the touchscreen display, a user interface requesting acceptance for accessing information of the electronic device according to the first utterance, and when the acceptance of the first utterance is received through the user interface, transmit, through a second application determined based on transmission history information with respect to the counterpart, data corresponding to the accepted information of the electronic device according to the acceptance to the counterpart.

18. The non-transitory storage medium of claim 17, wherein the one or more computer programs further include computer-executable instructions that, when executed by one or more processors individually or collectively, cause the electronic device to display during the call a first indicator indicating that the call with an assistance module is in progress.

19. The non-transitory storage medium of claim 17, further comprising:

at least one speaker, wherein the one or more computer programs further include computer-executable instructions that, when executed by one or more processors individually or collectively, cause the electronic device to control the at least one speaker to not output, through the at least one speaker, the call with the counterpart.

20. The non-transitory storage medium of claim 17, wherein the one or more computer programs further include computer-executable instructions that, when executed by one or more processors individually or collectively, cause the electronic device to:

display a notification indicating that the counterpart is performing the call with an assistance module, and display a screen including content of the call between the counterpart and the assistance module, based on another selection input that is made to the notification.

* * * * *